(12) United States Patent
Yeh et al.

(10) Patent No.: US 11,333,860 B2
(45) Date of Patent: May 17, 2022

(54) IMAGING LENS SYSTEM, IMAGE CAPTURING UNIT AND ELECTRONIC DEVICE

(71) Applicant: LARGAN PRECISION CO., LTD., Taichung (TW)

(72) Inventors: Kuan-Ting Yeh, Taichung (TW); Hung-Shuo Chen, Taichung (TW); Chien-Hsun Wu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 200 days.

(21) Appl. No.: 16/746,861

(22) Filed: Jan. 18, 2020

(65) Prior Publication Data
US 2020/0150402 A1    May 14, 2020

Related U.S. Application Data

(63) Continuation of application No. 15/867,587, filed on Jan. 10, 2018, now Pat. No. 10,578,838.

(30) Foreign Application Priority Data

Aug. 30, 2017  (TW) ................................ 106129571

(51) Int. Cl.
*G02B 13/00*    (2006.01)
*G02B 13/18*    (2006.01)
*G02B 9/60*    (2006.01)
*G02B 27/00*    (2006.01)

(52) U.S. Cl.
CPC ........... *G02B 13/0045* (2013.01); *G02B 9/60* (2013.01); *G02B 13/18* (2013.01); *G02B 27/0025* (2013.01)

(58) Field of Classification Search
CPC ...... G02B 13/0045; G02B 13/18; G02B 9/60; G02B 27/0025
USPC ................................................. 359/708, 714
See application file for complete search history.

(56) References Cited

U.S. PATENT DOCUMENTS

| 10,175,458 B2 | 1/2019 | Hsieh et al. |
| 2012/0087020 A1* | 4/2012 | Tang ................... G02B 13/0045 359/714 |
| 2017/0102522 A1* | 4/2017 | Jo ........................... G02B 9/60 |

* cited by examiner

*Primary Examiner* — James R Greece
(74) *Attorney, Agent, or Firm* — Maschoff Brennan

(57) ABSTRACT

An imaging lens system includes five lens elements, which are, in order from an object side to an image side: a first lens element, a second lens element, a third lens element, a fourth lens element and a fifth lens element. At least one of an object-side surface and an image-side surface of the fifth lens element has at least one inflection point. The object-side surface and the image-side surface of the fifth lens element are both aspheric.

25 Claims, 28 Drawing Sheets

IMAGING LENS SYSTEM, IMAGE CAPTURING UNIT AND ELECTRONIC DEVICE

RELATED APPLICATIONS

This application is a continuation patent application of U.S. application Ser. No. 15/867,587, filed on Jan. 10, 2018, which claims priority to Taiwan Application 106129571, filed on Aug. 30, 2017, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

In recent years, with the popularity of electronic devices having camera functionalities, the demand of miniaturized optical systems has been increasing. As advanced semiconductor manufacturing technologies have reduced the pixel size of sensors, and compact optical systems have gradually evolved toward the field of higher megapixels, there is an increasing demand for compact optical systems featuring better image quality.

For various applications, the optical systems have been widely applied to different kinds of electronic devices, such as vehicle devices, image recognition systems, entertainment devices, sport devices and intelligent home systems. Furthermore, in order to provide better user experience, electronic devices equipped with one or more optical systems have become the mainstream products on the market, and the optical systems are developed with various optical features according to different requirements.

Generally, a conventional electronic device equipped with multiple cameras usually includes a camera featuring large field of view and another camera featuring smaller field of view to perform optical zoom functionality by software. In detail, it uses two images with different fields of view to emulate and produce an optical zoom effect by a single-lens reflex camera. However, the size and length of the optical systems in these cameras are often constrained to allow integrations in compact portable devices. Thus, the optical systems featuring smaller field of view are usually equipped with an image sensor having a small image height in order to meet the compactness requirement. However, the image sensor with a small image height leads to limited image resolution. Accordingly, there is a need for a new optical system featuring small field of view with high image resolution.

SUMMARY

According to one aspect of the present disclosure, an imaging lens system includes five lens elements. The five lens elements are, in order from an object side to an image side, a first lens element, a second lens element, a third lens element, a fourth lens element and a fifth lens element. At least one of an object-side surface of the fifth lens element and an image-side surface of the fifth lens element has at least one inflection point. The object-side surface and the image-side surface of the fifth lens element are both aspheric. When a focal length of the imaging lens system is f, a maximum image height of the imaging lens system is ImgH, an axial distance between an object-side surface of the first lens element and an image surface is TL, an axial distance between the image-side surface of the fifth lens element and the image surface is BL, and an axial distance between the fourth lens element and the fifth lens element is T45, the following conditions are satisfied:

$7.0 < (f \times ImgH)/[TL \times (f-TL)]$;
$0.5 < TL/ImgH \leq 1.55$; and
$0 < BL/T45 < 3.0$.

According to another aspect of the present disclosure, an image capturing unit includes the aforementioned imaging lens system and an image sensor, wherein the image sensor is disposed on the image surface of the imaging lens system.

According to still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
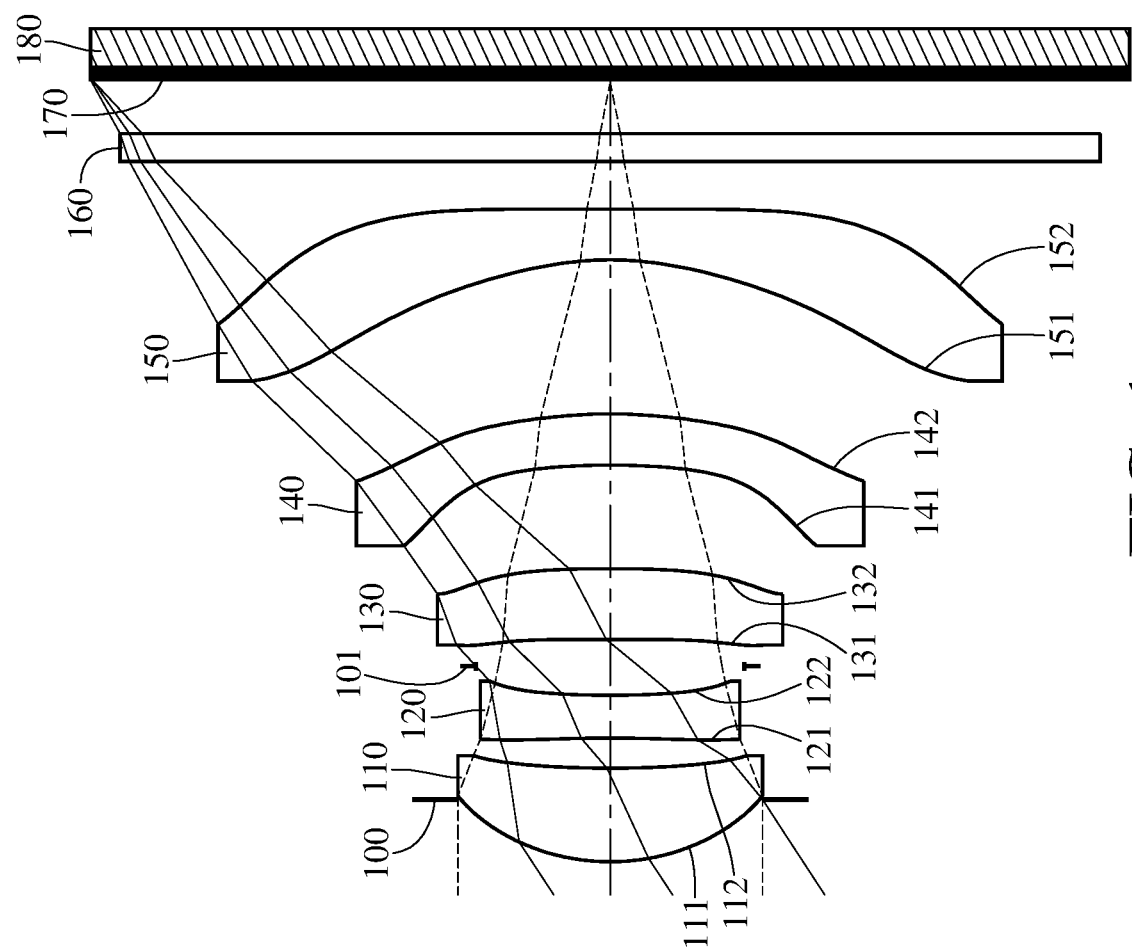
FIG. 1 is a schematic view of an image capturing unit according to the 1st embodiment of the present disclosure.

An imaging lens system includes five lens elements. The five lens elements are, in order from an object side to an image side, a first lens element, a second lens element, a third lens element, a fourth lens element and a fifth lens element.

The first lens element can have positive refractive power, and the first lens element can have an object-side surface being convex in a paraxial region thereof and an image-side surface being concave in a paraxial region thereof. Therefore, it is favorable for reducing a total track length of the imaging lens system by providing sufficient light convergence.

The second lens element can have negative refractive power, and the second lens element can have an object-side surface being concave in a paraxial region thereof and an image-side surface being concave in a paraxial region thereof. Therefore, it is favorable for correcting aberrations so as to improve image quality.

The third lens element can have positive refractive power; therefore, it is favorable for guiding light to travel in the imaging lens system and reducing sensitivity. At least one of an object-side surface of the third lens element and an image-side surface of the third lens element can have at least one inflection point; therefore, it is favorable for correcting off-axis aberrations and reducing the total track length of the imaging lens system.

At least one of an object-side surface of the fourth lens element and an image-side surface of the fourth lens element can have at least one inflection point. Therefore, it is favorable for controlling the traveling direction of light rays so as to prevent the outer diameter of the fourth lens element from being overly large, thereby reducing the size of the imaging lens system.

At least one of an object-side surface of the fifth lens element and an image-side surface of the fifth lens element has at least one inflection point. Therefore, it is favorable for correcting off-axis aberrations, controlling the incident angle in the off-axis region to reduce vignetting at the image periphery, and correcting Petzval field curvature to reduce distortion.

When a focal length of the imaging lens system is f, a maximum image height of the imaging lens system (half of a diagonal length of an effective photosensitive area of an image sensor) is ImgH, and an axial distance between the object-side surface of the first lens element and an image surface is TL, the following condition is satisfied: $7.0<(f\times ImgH)/[TL\times(f-TL)]$. Therefore, the arrangement of the lens elements is favorable for obtaining a higher image height with small field of view of the imaging lens system, so that the imaging lens system can be configured with an image sensor having a larger imaging surface or high image resolution, thereby enhancing optical performance with a coordinated configuration with another imaging capturing unit having larger field of view. Preferably, the following condition can also be satisfied: $10<(f\times ImgH)/[TL\times(f-TL)]<50$.

When the axial distance between the object-side surface of the first lens element and the image surface is TL, and the maximum image height of the imaging lens system is ImgH, the following condition is satisfied: $0.5<TL/ImgH\leq 1.55$. Therefore, it is favorable for the imaging lens system to be applicable to compact devices for various applications.

When an axial distance between the image-side surface of the fifth lens element and the image surface is BL, and an axial distance between the fourth lens element and the fifth lens element is T45, the following condition is satisfied: $0<BL/T45<3.0$. Therefore, it is favorable for reducing a back focal length so as to reduce the size of the imaging lens system; furthermore, it is favorable for providing sufficient axial distance between the fourth lens element and the fifth lens element so as to prevent total reflection, thereby improving image quality. Preferably, the following condition can also be satisfied: $0<BL/T45<1.5$.

When the axial distance between the object-side surface of the first lens element and the image surface is TL, the focal length of the imaging lens system is f, and a maximum field of view of the imaging lens system is FOV, the following condition can be satisfied: $0.35<TL/[f\times\tan(FOV)]<0.55$. Therefore, it is favorable for the imaging lens system to enhance the zoom function with the configuration of a small field of view.

When an axial distance between the first lens element and the second lens element is T12, an axial distance between the second lens element and the third lens element is T23, an axial distance between the third lens element and the fourth lens element is T34, the axial distance between the fourth lens element and the fifth lens element is T45, a sum of central thicknesses of the lens elements (the first through the fifth lens elements) of the imaging lens system is ΣCT, and a sum of axial distances between every adjacent lens elements of the imaging lens system is ΣAT, the following conditions can be satisfied: $1.0<T45/T12$; $1.0<T45/T23$; $1.0<T45/T34$; $\Sigma CT/T45<2.50$; and $\Sigma AT/T45<3.0$. Therefore, it is favorable for properly arranging the axial distances between every adjacent lens elements of the imaging lens system so that the lens elements can obtain a balanced configuration between optical and structural properties, thereby increasing assembling yield rate. Preferably, the following conditions can be satisfied: $2.0<T45/T12$; $1.50<T45/T23<10$; and $1.25<T45/T34<8.0$. More preferably, the following conditions can also be satisfied: $5.0<T45/T12$; and $2.0<T45/T23<6.0$.

When a central thickness of the first lens element is CT1, a central thickness of the second lens element is CT2, a central thickness of the third lens element is CT3, a central thickness of the fourth lens element is CT4, and a central thickness of the fifth lens element is CT5, the following conditions can be satisfied: 1.0<CT1/CT2; 1.0<CT1/CT3; 1.0<CT1/CT4; and 1.0<CT1/CT5. Therefore, it is favorable for obtaining a desirable lens shape configuration of the first lens element for molding so as to increase manufacturing yield rate. Preferably, the following conditions can be satisfied: 1.5<CT1/CT2<5.0; 1.0<CT1/CT3<2.0; 1.25<CT1/CT4<4.0; and 1.0<CT1/CT5<2.5. More preferably, the following conditions can also be satisfied: 2.0<CT1/CT2<4.0; and 1.5<CT1/CT4<3.0. When an Abbe number of the second lens element is V2, an Abbe number of the third lens element is V3, and an Abbe number of the fourth lens element is V4, the following conditions can be satisfied: V3<32; and V2+V3+V4<90. Therefore, it is favorable for enhancing the capability of correcting chromatic aberration so as to obtain high image quality with a large aperture configuration. Preferably, the following conditions can also be satisfied: V3<28; and 40<V2+V3+V4<85.

When a curvature radius of the object-side surface of the fifth lens element is R9, and a curvature radius of the image-side surface of the fifth lens element is R10, the following condition can be satisfied: −2.0<(R9+R10)/(R9+R10)<0. Therefore, a shape at the periphery of the fifth lens element is favorable for the fifth lens element to be assembled with other lens elements so as to reduce manufacturing complexity.

When a focal length of the third lens element is f3, a focal length of the fourth lens element is f4, and a focal length of the fifth lens element is f5, the following condition can be satisfied: |f5/f3|+|f5/f4|<1.0. Therefore, it is favorable for strengthening the refractive power of the fifth lens element so as to correct aberrations generated by the first and the second lens elements with stronger refractive power, thereby improving image quality.

When a focal length of the first lens element is f1, a focal length of the second lens element is f2, and the focal length of the fifth lens element is f5, the following conditions can be satisfied: |f1|/|f2|<1.0; and |f1|/|f5|<1.0. Therefore, it is favorable for strengthening the refractive power of the first lens element, such that with the configuration of the imaging lens system having a large aperture, the imaging lens system is able to gather light from the peripheral field so as to increase relative illuminance on the periphery of the image surface.

According to the present disclosure, the aforementioned features and conditions can be utilized in numerous combinations so as to achieve corresponding effects.

According to the present disclosure, the lens elements thereof can be made of glass or plastic material. When the lens elements are made of glass material, the distribution of the refractive power of the imaging lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the imaging lens system can also be reduced.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the imaging lens system, based on the corresponding image sensor, can be flat or curved, especially a curved surface being concave facing towards the object side of the imaging lens system.

According to the present disclosure, an image correction unit, such as a field flattener, can be optionally disposed between the lens element closest to the image side of the imaging lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens system and thereby provides a wider field of view for the same.

According to the above description of the present disclosure, the following specific embodiments are provided for further explanation.

1st Embodiment

Figure 2:
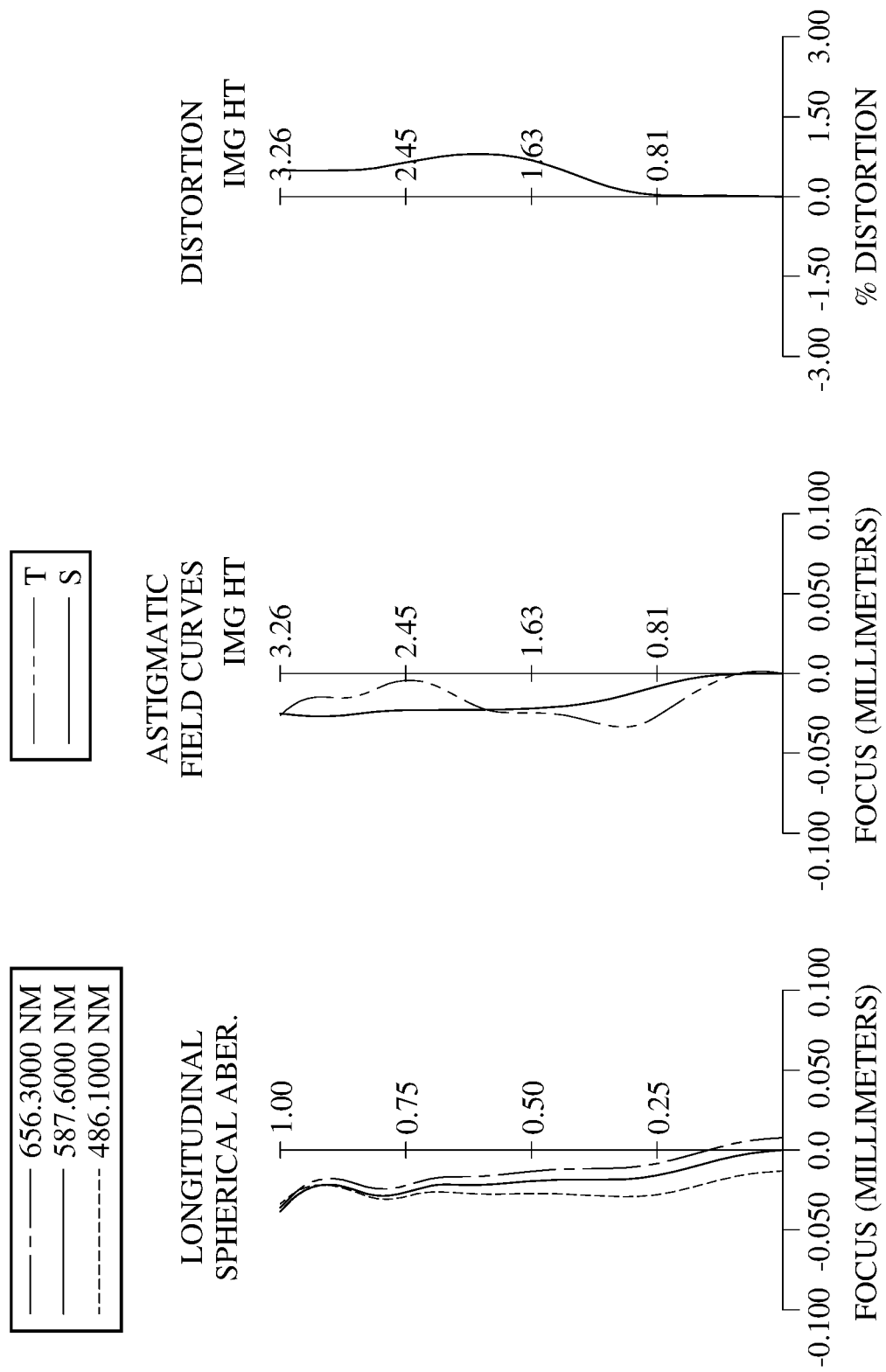
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens system (its reference numeral is omitted) of the present disclosure and an image sensor 180. The imaging lens system includes, in order from an object side to an image side, an aperture stop 100, a first lens element 110, a second lens element 120, a stop 101, a third lens element 130, a fourth lens element 140, a fifth lens element 150, an IR-cut filter 160 and an image surface 170. The imaging lens system includes five lens elements (110, 120, 130, 140 and 150) with no additional lens element disposed between each of the adjacent five lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric. Each of the object-side surface 131 and the image-side surface 132 of the third lens element 130 has at least one inflection point.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. Each of the object-side surface 141 and the image-side surface 142 of the fourth lens element 140 has at least one inflection point.

The fifth lens element 150 with negative refractive power has an object-side surface 151 being concave in a paraxial region thereof and an image-side surface 152 being planar in a paraxial region thereof. The fifth lens element 150 is made of plastic material and has the object-side surface 151 and the image-side surface 152 being both aspheric. Each of the object-side surface 151 and the image-side surface 152 of the fifth lens element 150 has at least one inflection point.

The IR-cut filter 160 is made of glass material and located between the fifth lens element 150 and the image surface 170, and will not affect the focal length of the imaging lens system. The image sensor 180 is disposed on or near the image surface 170 of the imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the imaging lens system of the image capturing unit according to the 1st embodiment, when a focal length of the imaging lens system is f, an f-number of the imaging lens system is Fno, and half of a maximum field of view of the imaging lens system is HFOV, these parameters have the following values: f=4.99 millimeters (mm), Fno=2.60, HFOV=33.2 degrees (deg.).

When the maximum field of view of the imaging lens system is FOV, the following condition is satisfied: FOV=66.4 [deg.].

When an Abbe number of the second lens element 120 is V2, an Abbe number of the third lens element 130 is V3, and an Abbe number of the fourth lens element 140 is V4, the following condition is satisfied: V2+V3+V4=68.42.

When the Abbe number of the third lens element 130 is V3, the following condition is satisfied: V3=21.47.

When a central thickness of the first lens element 110 is CT1, and a central thickness of the second lens element 120 is CT2, the following condition is satisfied: CT1/CT2=2.19.

When the central thickness of the first lens element 110 is CT1, and a central thickness of the third lens element 130 is CT3, the following condition is satisfied: CT1/CT3=1.32.

When the central thickness of the first lens element 110 is CT1, and a central thickness of the fourth lens element 140 is CT4, the following condition is satisfied: CT1/CT4=1.83.

When the central thickness of the first lens element 110 is CT1, and a central thickness of the fifth lens element 150 is CT5, the following condition is satisfied: CT1/CT5=1.84.

When an axial distance between the first lens element 110 and the second lens element 120 is T12, and an axial distance between the fourth lens element 140 and the fifth lens element 150 is T45, the following condition is satisfied: T45/T12=5.11. In this embodiment, an axial distance between two adjacent lens elements is an air gap in a paraxial region between the two adjacent lens elements.

When an axial distance between the second lens element 120 and the third lens element 130 is T23, and the axial distance between the fourth lens element 140 and the fifth lens element 150 is T45, the following condition is satisfied: T45/T23=2.76.

When an axial distance between the third lens element 130 and the fourth lens element 140 is T34, and the axial distance between the fourth lens element 140 and the fifth lens element 150 is T45, the following condition is satisfied: T45/T34=1.49.

When a sum of central thicknesses of the lens elements of the imaging lens system is ΣCT, and the axial distance between the fourth lens element 140 and the fifth lens element 150 is T45, the following condition is satisfied: ΣCT/T45=2.01.

When a sum of axial distances between every adjacent lens elements of the imaging lens system is ΣAT, and the axial distance between the fourth lens element 140 and the fifth lens element 150 is T45, the following condition is satisfied: ΣAT/T45=2.23.

When an axial distance between the image-side surface 152 of the fifth lens element 150 and the image surface 170 is BL, and the axial distance between the fourth lens element 140 and the fifth lens element 150 is T45, the following condition is satisfied: BL/T45=0.84.

When an axial distance between the object-side surface 111 of the first lens element 110 and the image surface 170 is TL, and a maximum image height of the imaging lens system is ImgH, the following condition is satisfied: TL/ImgH=1.51.

When the axial distance between the object-side surface 111 of the first lens element 110 and the image surface 170 is TL, the focal length of the imaging lens system is f, and the maximum field of view of the imaging lens system is FOV, the following condition is satisfied: TL/[f×tan(FOV)]=0.43.

When a curvature radius of the object-side surface 151 of the fifth lens element 150 is R9, and a curvature radius of the image-side surface 152 of the fifth lens element 150 is R10, the following condition is satisfied: (R9+R10)/(R9−R10)=−1.00.

When a focal length of the third lens element 130 is f3, a focal length of the fourth lens element 140 is f4, and a focal length of the fifth lens element 150 is f5, the following condition is satisfied: |f5/f3|+|f5/f4|=0.50.

When a focal length of the first lens element 110 is f1, and a focal length of the second lens element 120 is f2, the following condition is satisfied: |f1|/|f2|=0.55.

When the focal length of the first lens element 110 is f1, and the focal length of the fifth lens element 150 is f5, the following condition is satisfied: |f1|/|f5|=0.83. When the focal length of the imaging lens system is f, the maximum image height of the imaging lens system is ImgH, and the axial distance between the object-side surface 111 of the first lens element 110 and the image surface 170 is TL, the following condition is satisfied: (f×ImgH)/[TL×(f−TL)]=56.84.

The detailed optical data of the 1st embodiment are shown in Table 1 and the aspheric surface data are shown in Table 2 below.

TABLE 1

1st Embodiment
f = 4.99 mm, Fno = 2.60, HFOV = 33.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.392 | | | | |
| 2 | Lens 1 | 1.387 | (ASP) | 0.590 | Plastic | 1.545 | 56.0 | 3.09 |
| 3 | | 6.667 | (ASP) | 0.190 | | | | |
| 4 | Lens 2 | −8.733 | (ASP) | 0.270 | Plastic | 1.681 | 18.7 | −5.58 |
| 5 | | 6.807 | (ASP) | 0.183 | | | | |
| 6 | Stop | Plano | | 0.169 | | | | |
| 7 | Lens 3 | 74.539 | (ASP) | 0.446 | Plastic | 1.650 | 21.5 | 14.51 |
| 8 | | −10.780 | (ASP) | 0.653 | | | | |
| 9 | Lens 4 | −4.524 | (ASP) | 0.323 | Plastic | 1.584 | 28.2 | 15.11 |
| 10 | | −3.070 | (ASP) | 0.971 | | | | |
| 11 | Lens 5 | −2.027 | (ASP) | 0.320 | Plastic | 1.544 | 55.9 | −3.73 |
| 12 | | ∞ | (ASP) | 0.300 | | | | |
| 13 | IR-cut Filter | Plano | | 0.175 | Glass | 1.517 | 64.2 | — |
| 14 | | Plano | | 0.339 | | | | |
| 15 | Image | Plano | | — | | | | |

Note:
Reference wavelength is 587.6 nm (d-line).
An effective radius of the stop 101 (Surface 6) is 0.845 mm.

TABLE 2

Aspheric Coefficients

| Surface # | 2 | 3 | 4 | 5 | 7 |
|---|---|---|---|---|---|
| k= | 6.9029E−01 | 6.6511E+00 | 8.9897E+01 | −1.3238E+01 | 9.0000E+01 |
| A4= | −3.9972E−02 | −3.8756E−04 | 7.6386E−02 | 5.3243E−02 | −1.0524E−01 |
| A6= | 1.6028E−01 | 8.7393E−02 | −1.5911E−01 | 5.5133E−02 | −8.0546E−02 |
| A8= | −1.1676E+00 | −5.3386E−01 | 2.0266E+00 | −4.1735E+00 | 4.5157E−01 |
| A10= | 4.6110E+00 | 3.0822E+00 | −1.0033E+01 | 2.3581E+01 | −1.1287E+00 |
| A12= | −1.1463E+01 | −1.0539E+01 | 2.9630E+01 | −8.2593E+01 | 2.0514E+00 |
| A14= | 1.7876E+01 | 2.2483E+01 | −5.3903E+01 | 1.8050E+02 | −2.6113E+00 |
| A16= | −1.7028E+01 | −2.9044E+01 | 5.8937E+01 | −2.3877E+02 | 2.3993E+00 |
| A18= | 9.0525E+00 | 2.0849E+01 | −3.5396E+01 | 1.7495E+02 | −1.2812E+00 |
| A20= | −2.0636E+00 | −6.3854E+00 | 8.9104E+00 | −5.4518E+01 | 2.6854E−01 |

| Surface # | 8 | 9 | 10 | 11 | 12 |
|---|---|---|---|---|---|
| k= | −1.9806E+01 | 3.9617E+00 | −6.8195E+00 | −1.5023E+00 | 0.0000E+00 |
| A4= | −1.2209E−01 | 5.9306E−04 | 6.9263E−02 | 8.0346E−02 | −3.0997E−03 |
| A6= | 6.3303E−02 | −5.1750E−02 | −1.1475E−01 | −5.9756E−02 | −8.1723E−03 |
| A8= | −4.8264E−01 | −3.9840E−01 | 2.5594E−02 | 2.1205E−02 | −1.8845E−03 |
| A10= | 1.7394E+00 | 1.0580E+00 | 1.8698E−02 | −2.7673E−03 | 3.2523E−03 |
| A12= | −3.6039E+00 | −1.5813E+00 | −2.3712E−02 | −9.3139E−04 | −1.5173E−03 |
| A14= | 4.6651E+00 | 1.4349E+00 | 2.2972E−02 | 5.6769E−04 | 3.8461E−04 |
| A16= | −3.6964E+00 | −7.5390E−01 | −1.2610E−02 | −1.2639E−04 | −5.7327E−05 |
| A18= | 1.6550E+00 | 2.1162E−01 | 3.2828E−03 | 1.3463E−05 | 4.7637E−06 |
| A20= | −3.1784E−01 | −2.4592E−02 | −3.2342E−04 | −5.6728E−07 | −1.6995E−07 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
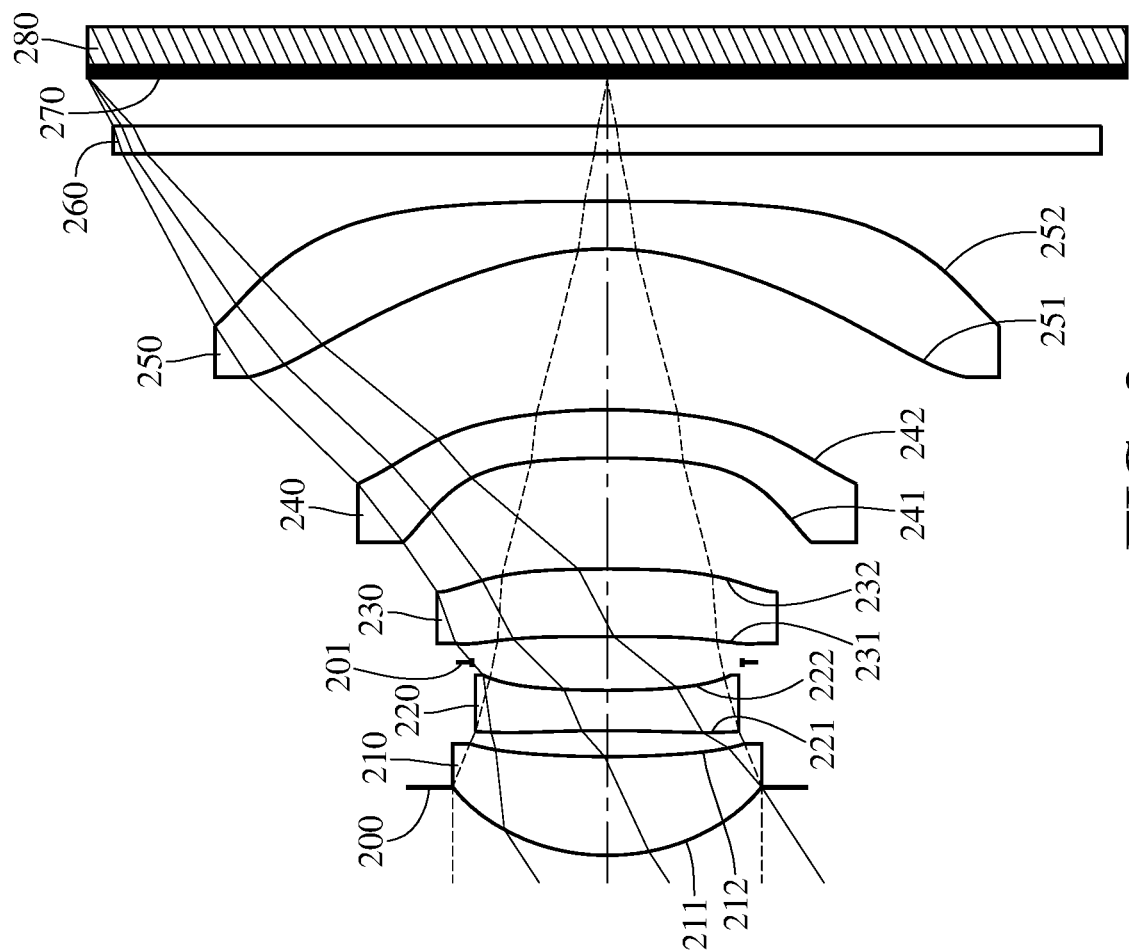
FIG. 3 is a schematic view of an image capturing unit according to the 2nd embodiment of the present disclosure.
Figure 4:
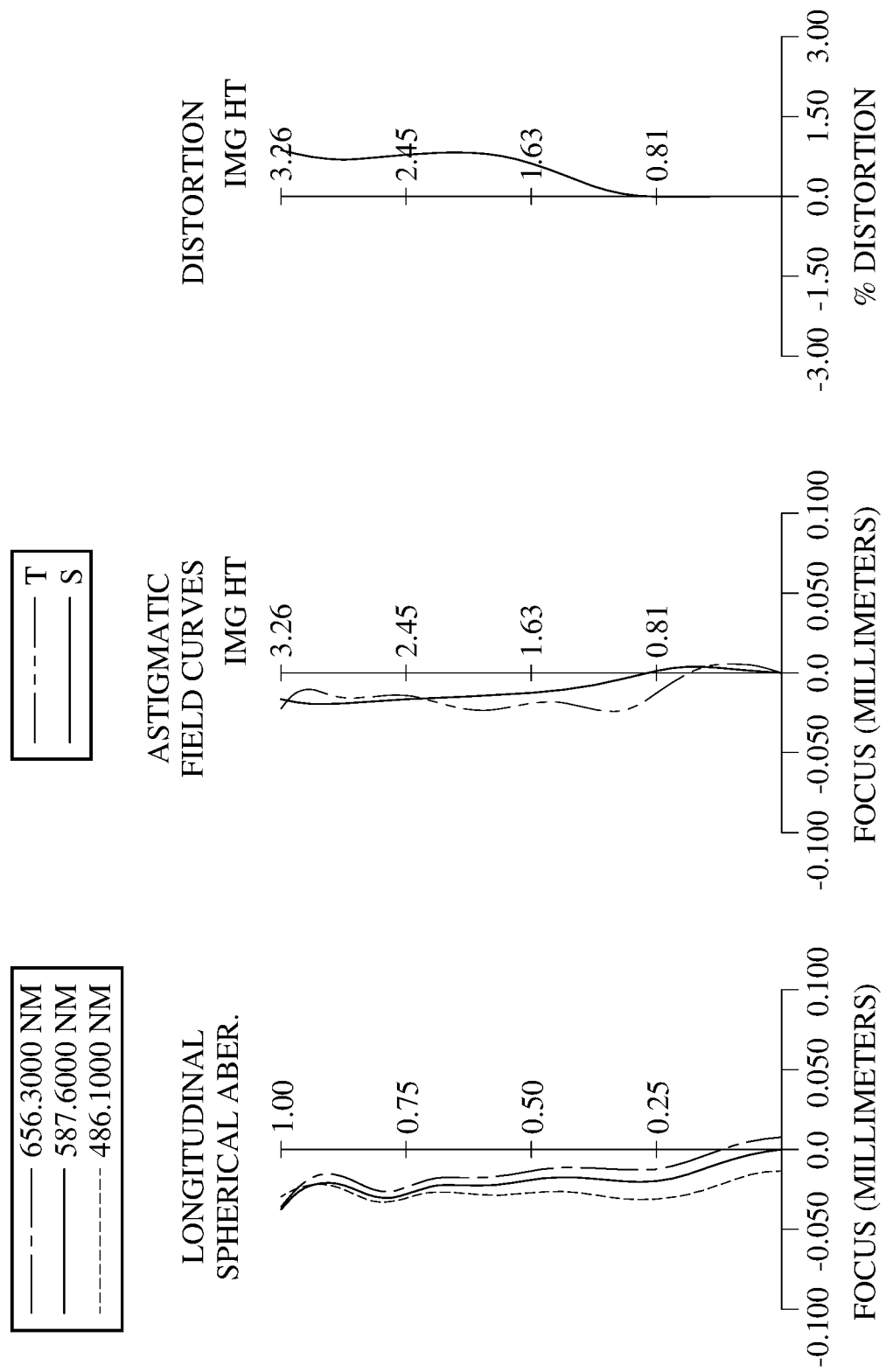
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens system (its reference numeral is omitted) of the present disclosure and an image sensor 280. The imaging lens system includes, in order from an object side to an image side, an aperture stop 200, a first lens element 210, a second lens element 220, a stop 201, a third lens element 230, a fourth lens element 240, a fifth lens element 250, an IR-cut filter 260 and an image surface 270. The imaging lens system includes five lens elements (210, 220, 230, 240 and 250) with no additional lens element disposed between each of the adjacent five lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being planar in a paraxial region thereof and an image-side surface 232 being convex in a paraxial region thereof. The third lens element 230 is made of plastic material and has the object-side surface 231 and the image-side surface 232 being both aspheric. Each of the object-side surface 231 and the image-side surface 232 of the third lens element 230 has at least one inflection point.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. Each of the object-side surface 241 and the image-side surface 242 of the fourth lens element 240 has at least one inflection point.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. Each of the object-side surface 251 and the image-side surface 252 of the fifth lens element 250 has at least one inflection point.

The IR-cut filter 260 is made of glass material and located between the fifth lens element 250 and the image surface 270, and will not affect the focal length of the imaging lens system. The image sensor 280 is disposed on or near the image surface 270 of the imaging lens system.

The detailed optical data of the 2nd embodiment are shown in Table 3 and the aspheric surface data are shown in Table 4 below.

TABLE 3

2nd Embodiment
f = 4.98 mm, Fno = 2.56, HFOV = 33.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.392 | | | | |
| 2 | Lens 1 | 1.385 | (ASP) | 0.590 | Plastic | 1.545 | 56.1 | 3.08 |
| 3 | | 6.635 | (ASP) | 0.190 | | | | |
| 4 | Lens 2 | −8.774 | (ASP) | 0.270 | Plastic | 1.681 | 18.7 | −5.70 |
| 5 | | 7.049 | (ASP) | 0.183 | | | | |
| 6 | Stop | Plano | | 0.169 | | | | |
| 7 | Lens 3 | ∞ | (ASP) | 0.446 | Plastic | 1.660 | 20.4 | 17.30 |
| 8 | | −11.419 | (ASP) | 0.653 | | | | |
| 9 | Lens 4 | −5.648 | (ASP) | 0.323 | Plastic | 1.584 | 28.2 | 15.53 |
| 10 | | −3.551 | (ASP) | 0.971 | | | | |
| 11 | Lens 5 | −1.985 | (ASP) | 0.320 | Plastic | 1.544 | 56.0 | −3.76 |
| 12 | | −68.393 | (ASP) | 0.300 | | | | |
| 13 | IR-cut Filter | Plano | | 0.175 | Glass | 1.517 | 64.2 | — |
| 14 | | Plano | | 0.339 | | | | |
| 15 | Image | Plano | | — | | | | |

Note:
Reference wavelength is 587.6 nm (d-line).
An effective radius of the stop 201 (Surface 6) is 0.850 mm.

TABLE 4

Aspheric Coefficients

| Surface # | 2 | 3 | 4 | 5 | 7 |
|---|---|---|---|---|---|
| k= | 6.8930E−01 | 9.2402E+00 | 8.9304E+01 | −2.6379E+01 | 0.0000E+00 |
| A4= | −3.1177E−02 | −9.9986E−03 | 6.4213E−02 | 4.9435E−02 | −1.3242E−01 |
| A6= | 7.4040E−02 | 1.6757E−01 | −1.2410E−01 | 4.2037E−01 | 5.8985E−06 |
| A8= | −6.9453E−01 | −1.1257E+00 | 1.8471E+00 | −2.8335E+00 | 1.9422E−01 |
| A10= | 3.0646E+00 | 5.8153E+00 | −8.9013E+00 | 1.6233E+01 | −8.1091E−01 |
| A12= | −8.3337E+00 | −1.8279E+01 | 2.5530E+01 | −5.7031E+01 | 2.8377E+00 |
| A14= | 1.3921E+01 | 3.6341E+01 | −4.5039E+01 | 1.2385E+02 | −6.0512E+00 |
| A16= | −1.4010E+01 | −4.4432E+01 | 4.7532E+01 | −1.6151E+02 | 7.7257E+00 |
| A18= | 7.7940E+00 | 3.0635E+01 | −2.7275E+01 | 1.1610E+02 | −5.1526E+00 |
| A20= | −1.8500E+00 | −9.1647E+00 | 6.3891E+00 | −3.5465E+01 | 1.3533E+00 |

| Surface # | 8 | 9 | 10 | 11 | 12 |
|---|---|---|---|---|---|
| k= | −9.8544E+01 | 1.4735E+01 | 2.2514E−01 | −1.3850E+00 | 0.0000E+00 |
| A4= | −1.4172E−01 | −6.6501E−02 | 3.0664E−02 | 1.2780E−02 | −5.0832E−02 |
| A6= | 9.0091E−02 | 1.4794E−01 | 3.8567E−03 | 6.2225E−02 | 6.0407E−02 |
| A8= | −4.6307E−01 | −8.3439E−01 | −1.8077E−01 | −8.5878E−02 | −5.1017E−02 |
| A10= | 1.5563E+00 | 1.6654E+00 | 2.6358E−01 | 5.5275E−02 | 2.5110E−02 |
| A12= | −3.2127E+00 | −2.0633E+00 | −2.1869E−01 | −2.0842E−02 | −7.8549E−03 |
| A14= | 4.3377E+00 | 1.5920E+00 | 1.2238E−01 | 4.8335E−03 | 1.5892E−03 |
| A16= | −3.6942E+00 | −7.2227E−01 | −4.3322E−02 | −6.7723E−04 | −2.0236E−04 |
| A18= | 1.8200E+00 | 1.7595E−01 | 8.4860E−03 | 5.2617E−05 | 1.4746E−05 |
| A20= | −3.9085E−01 | −1.7609E−02 | −6.9220E−04 | −1.7424E−06 | −4.6637E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.98 | T45/T34 | 1.45 |
| Fno | 2.56 | ΣCT/T45 | 1.88 |
| HFOV [deg.] | 33.1 | ΣAT/T45 | 2.19 |
| FOV [deg.] | 66.2 | BL/T45 | 0.77 |
| V2 + V3 + V4 | 67.34 | TL/ImgH | 1.50 |
| V3 | 20.40 | TL/[f × tan(FOV)] | 0.43 |
| CT1/CT2 | 2.45 | (R9 + R10)/(R9 − R10) | −1.06 |
| CT1/CT3 | 1.46 | \|f5/f3\| + \|f5/f4\| | 0.46 |
| CT1/CT4 | 2.05 | \|f1\|/\|f2\| | 0.54 |
| CT1/CT5 | 2.07 | \|f1\|/\|f5\| | 0.82 |
| T45/T12 | 6.18 | (f × ImgH)/[TL × (f − TL)] | 40.50 |
| T45/T23 | 3.00 | — | — |

3rd Embodiment

Figure 5:
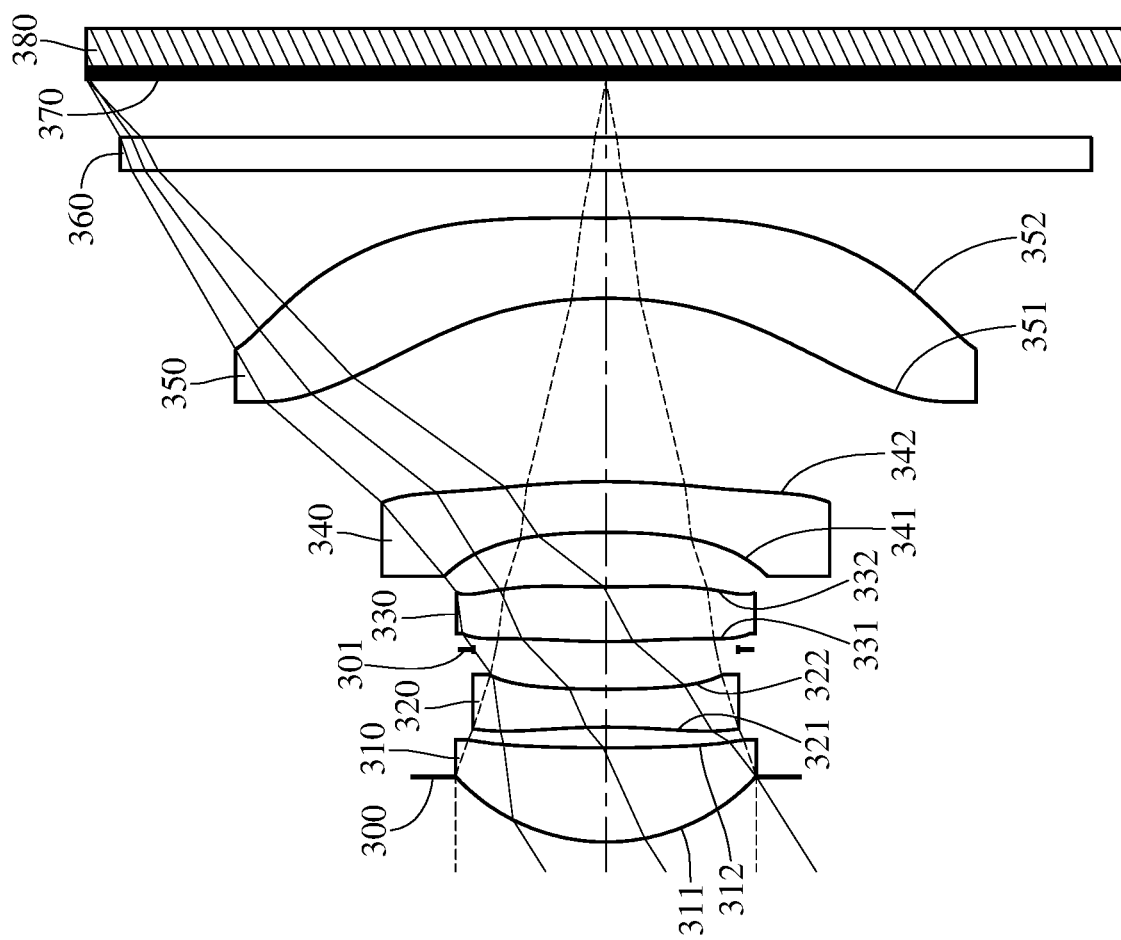
FIG. 5 is a schematic view of an image capturing unit according to the 3rd embodiment of the present disclosure.
Figure 6:
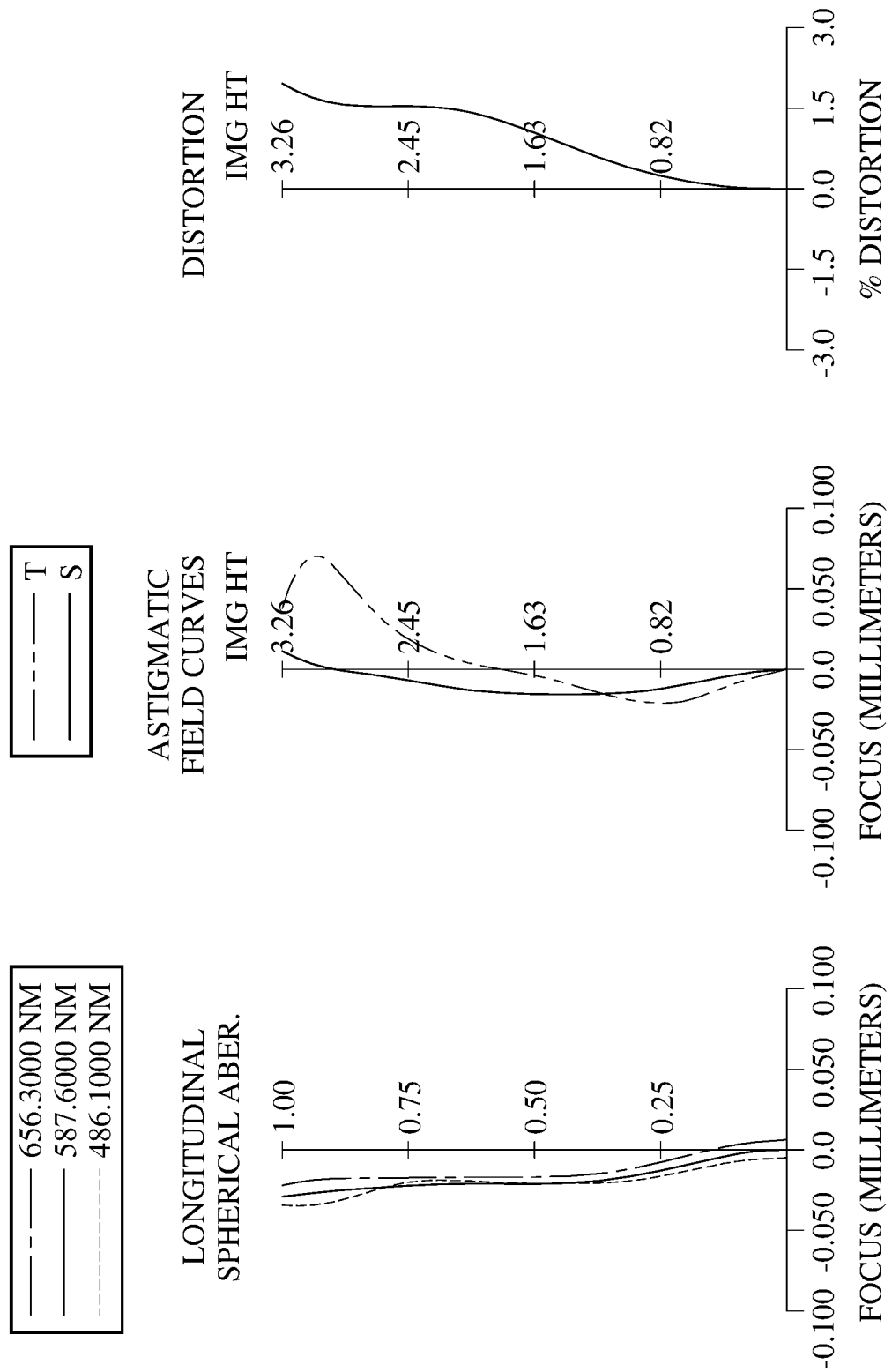
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens system (its reference numeral is omitted) of the present disclosure and an image sensor 380. The imaging lens system includes, in order from an object side to an image side, an aperture stop 300, a first lens element 310, a second lens element 320, a stop 301, a third lens element 330, a fourth lens element 340, a fifth lens element 350, an IR-cut filter 360 and an image surface 370. The imaging lens system includes five lens elements (310, 320, 330, 340 and 350) with no additional lens element disposed between each of the adjacent five lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. Each of the object-side surface 331 and the image-side surface 332 of the third lens element 330 has at least one inflection point.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The image-side surface 342 of the fourth lens element 340 has at least one inflection point.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. Each of the object-side surface 351 and the image-side surface 352 of the fifth lens element 350 has at least one inflection point.

The IR-cut filter 360 is made of glass material and located between the fifth lens element 350 and the image surface 370, and will not affect the focal length of the imaging lens system. The image sensor 380 is disposed on or near the image surface 370 of the imaging lens system.

The detailed optical data of the 3rd embodiment are shown in Table 5 and the aspheric surface data are shown in Table 6 below.

TABLE 5

3rd Embodiment
f = 5.09 mm, Fno = 2.68, HFOV = 32.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.412 | | | | |
| 2 | Lens 1 | 1.299 | (ASP) | 0.595 | Plastic | 1.545 | 56.0 | 2.65 |
| 3 | | 10.909 | (ASP) | 0.131 | | | | |
| 4 | Lens 2 | −4.422 | (ASP) | 0.240 | Plastic | 1.660 | 20.4 | −4.11 |
| 5 | | 7.158 | (ASP) | 0.251 | | | | |
| 6 | Stop | Plano | | 0.050 | | | | |
| 7 | Lens 3 | 4.145 | (ASP) | 0.346 | Plastic | 1.660 | 20.4 | 12.35 |
| 8 | | 8.155 | (ASP) | 0.345 | | | | |
| 9 | Lens 4 | −4.735 | (ASP) | 0.320 | Plastic | 1.566 | 37.4 | −249.96 |
| 10 | | −5.018 | (ASP) | 1.160 | | | | |
| 11 | Lens 5 | −2.838 | (ASP) | 0.507 | Plastic | 1.544 | 56.0 | −4.91 |
| 12 | | 48.293 | (ASP) | 0.300 | | | | |
| 13 | IR-cut Filter | Plano | | 0.210 | Glass | 1.517 | 64.2 | — |
| 14 | | Plano | | 0.366 | | | | |
| 15 | Image | Plano | | — | | | | |

Note:
Reference wavelength is 587.6 nm (d-line).
An effective radius of the stop 301 (Surface 6) is 0.835 mm.

TABLE 6

Aspheric Coefficients

| Surface # | 2 | 3 | 4 | 5 | 7 |
|---|---|---|---|---|---|
| k= | −2.4888E−01 | 6.7717E+01 | −8.5763E+01 | 1.7901E+01 | 0.0000E+00 |
| A4= | −1.7854E−03 | −5.8842E−02 | −8.2806E−02 | 1.3743E−03 | −2.5888E−01 |
| A6= | 9.0477E−02 | 3.5532E−01 | 7.6643E−01 | 7.0075E−01 | 1.2362E−01 |
| A8= | −1.8162E−01 | −9.7731E−01 | −1.9153E+00 | −1.8074E+00 | 2.1073E−01 |
| A10= | 2.0064E−01 | 1.5763E+00 | 2.9706E+00 | 3.1985E+00 | −6.5245E−01 |
| A12= | −7.5083E−02 | −1.1369E+00 | −2.3229E+00 | −2.6267E+00 | 1.1603E+00 |
| A14= | — | 2.3577E−01 | 6.3650E−01 | 8.5388E−01 | −6.0458E−01 |

| Surface # | 8 | 9 | 10 | 11 | 12 |
|---|---|---|---|---|---|
| k= | 0.0000E+00 | 0.0000E+00 | −3.3028E+01 | −1.8005E+01 | 2.5672E+01 |
| A4= | −2.7214E−01 | −8.8031E−02 | 6.6568E−03 | −1.4825E−01 | −1.3683E−01 |
| A6= | 1.0374E−01 | −2.8234E−01 | −5.4051E−02 | 9.7568E−02 | 8.7379E−02 |
| A8= | −1.2110E−01 | 8.1445E−01 | 1.7960E−01 | −4.1355E−02 | −4.1123E−02 |
| A10= | 4.4277E−01 | −1.5552E+00 | −1.8471E−01 | 1.2748E−02 | 1.2336E−02 |
| A12= | −5.3289E−01 | 1.9108E+00 | 8.2081E−02 | −2.5464E−03 | −2.3345E−03 |
| A14= | 3.3065E−01 | −1.3262E+00 | −1.5602E−02 | 2.8555E−04 | 2.5005E−04 |
| A16= | — | 3.7491E−01 | 7.4938E−04 | −1.3449E−05 | −1.1151E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.09 | T45/T34 | 3.36 |
| Fno | 2.68 | ΣCT/T45 | 1.73 |
| HFOV [deg.] | 32.3 | ΣAT/T45 | 1.67 |
| FOV [deg.] | 64.6 | BL/T45 | 0.75 |
| V2 + V3 + V4 | 78.24 | TL/ImgH | 1.48 |

-continued

| 3rd Embodiment | | | |
|---|---|---|---|
| V3 | 20.40 | TL/[f × tan(FOV)] | 0.45 |
| CT1/CT2 | 2.48 | (R9 + R10)/(R9 − R10) | −0.89 |
| CT1/CT3 | 1.72 | |f5/f3| + |f5/f4| | 0.42 |
| CT1/CT4 | 1.86 | |f1|/|f2| | 0.65 |
| CT1/CT5 | 1.17 | |f1|/|f5| | 0.54 |
| T45/T12 | 8.85 | (f × ImgH)/[TL × (f − TL)] | 12.74 |
| T45/T23 | 3.85 | — | — |

4th Embodiment

Figure 7:
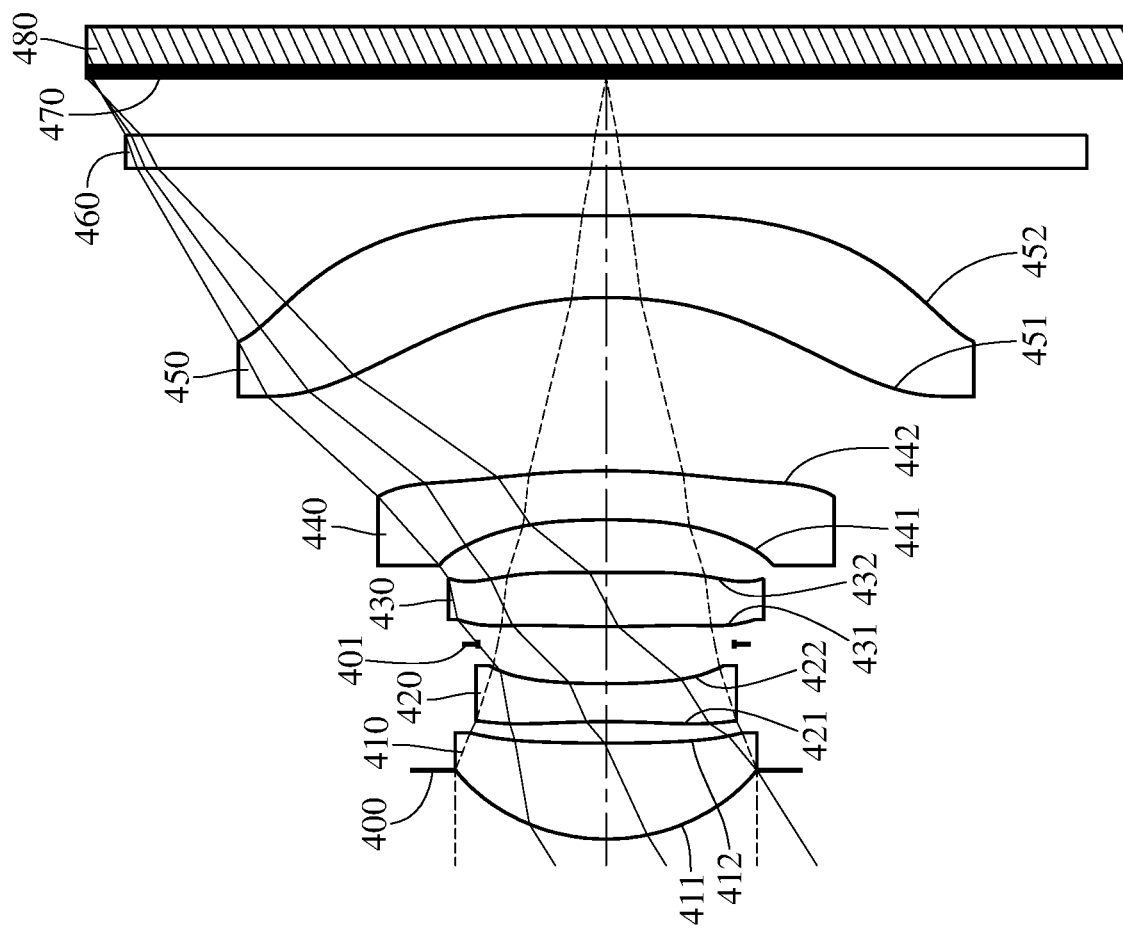
FIG. 7 is a schematic view of an image capturing unit according to the 4th embodiment of the present disclosure.
Figure 8:
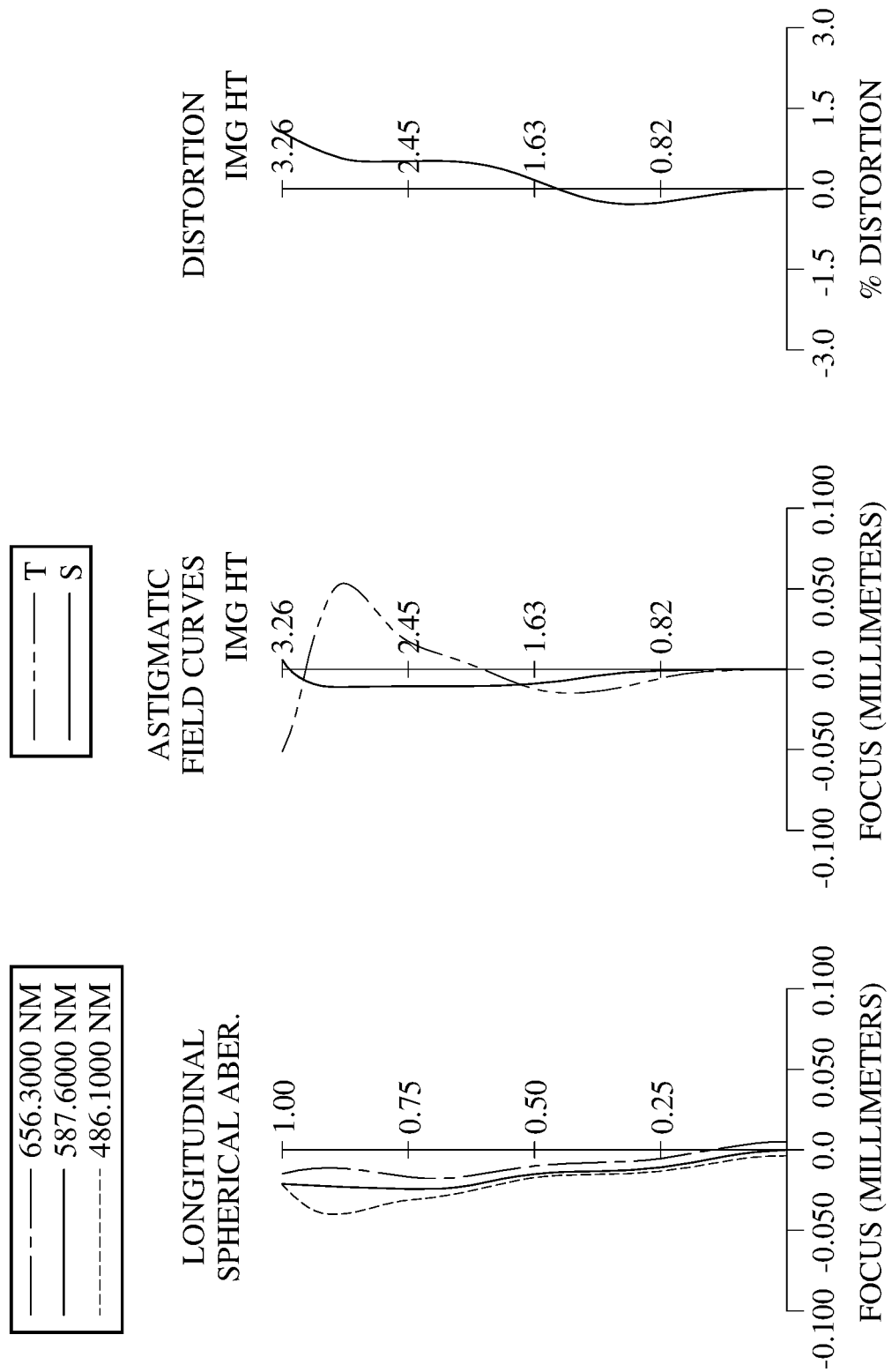
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens system (its reference numeral is omitted) of the present disclosure and an image sensor 480. The imaging lens system includes, in order from an object side to an image side, an aperture stop 400, a first lens element 410, a second lens element 420, a stop 401, a third lens element 430, a fourth lens element 440, a fifth lens element 450, an IR-cut filter 460 and an image surface 470. The imaging lens system includes five lens elements (410, 420, 430, 440 and 450) with no additional lens element disposed between each of the adjacent five lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. Each of the object-side surface 431 and the image-side surface 432 of the third lens element 430 has at least one inflection point.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The image-side surface 442 of the fourth lens element 440 has at least one inflection point.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. Each of the object-side surface 451 and the image-side surface 452 of the fifth lens element 450 has at least one inflection point. The IR-cut filter 460 is made of glass material and located between the fifth lens element 450 and the image surface 470, and will not affect the focal length of the imaging lens system. The image sensor 480 is disposed on or near the image surface 470 of the imaging lens system.

The detailed optical data of the 4th embodiment are shown in Table 7 and the aspheric surface data are shown in Table 8 below.

TABLE 7

4th Embodiment
f = 5.14 mm, Fno = 2.69, HFOV = 32.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.435 | | | | |
| 2 | Lens 1 | 1.295 | (ASP) | 0.607 | Plastic | 1.545 | 56.0 | 2.62 |
| 3 | | 11.816 | (ASP) | 0.136 | | | | |
| 4 | Lens 2 | −5.723 | (ASP) | 0.240 | Plastic | 1.660 | 20.4 | −4.14 |
| 5 | | 5.321 | (ASP) | 0.251 | | | | |
| 6 | Stop | Plano | | 0.110 | | | | |
| 7 | Lens 3 | 6.491 | (ASP) | 0.343 | Plastic | 1.660 | 20.4 | 13.78 |
| 8 | | 22.196 | (ASP) | 0.333 | | | | |
| 9 | Lens 4 | −4.684 | (ASP) | 0.310 | Plastic | 1.566 | 37.4 | −257.49 |
| 10 | | −4.955 | (ASP) | 1.096 | | | | |
| 11 | Lens 5 | −2.976 | (ASP) | 0.518 | Plastic | 1.544 | 56.0 | −4.52 |
| 12 | | 14.994 | (ASP) | 0.300 | | | | |
| 13 | IR-cut Filter | Plano | | 0.210 | Glass | 1.517 | 64.2 | — |
| 14 | | Plano | | 0.361 | | | | |
| 15 | Image | Plano | | — | | | | |

Note:
Reference wavelength is 587.6 nm (d-line).
An effective radius of the image-side surface 422 (Surface 5) is 0.740 mm.
An effective radius of the stop 401 (Surface 6) is 0.810 mm.

TABLE 8

Aspheric Coefficients

| Surface # | 2 | 3 | 4 | 5 | 7 |
|---|---|---|---|---|---|
| k= | −1.9022E−01 | 7.6822E+01 | 2.0354E+00 | 2.0084E+01 | 1.5255E+01 |
| A4= | 3.9531E−04 | −2.2300E−02 | 9.1446E−02 | 5.2396E−02 | −2.3014E−01 |

TABLE 8-continued

| Aspheric Coefficients | | | | |
|---|---|---|---|---|
| A6= | 7.3354E−02 | 3.5885E−01 | 4.1634E−01 | 6.6695E−01 | 2.1123E−01 |
| A8= | −1.1992E−01 | −1.0720E+00 | −1.5031E+00 | −2.4937E+00 | −3.9334E−01 |
| A10= | 1.0867E−01 | 1.7351E+00 | 2.9466E+00 | 6.0551E+00 | 1.0753E+00 |
| A12= | −8.3562E−03 | −1.0132E+00 | −2.6351E+00 | −6.8991E+00 | −8.3422E−01 |
| A14= | — | — | 6.8296E−01 | 2.9004E+00 | 1.4862E−01 |

| Surface # | 8 | 9 | 10 | 11 | 12 |
|---|---|---|---|---|---|
| k= | 9.0000E+01 | −1.6436E+01 | −1.7189E+01 | −1.9759E+01 | 2.5672E+01 |
| A4= | −2.5874E−01 | −1.5142E−01 | 3.4366E−04 | −1.9117E−01 | −1.3683E−01 |
| A6= | 5.3563E−02 | −3.3488E−02 | 4.8047E−03 | 1.7372E−01 | 8.7379E−02 |
| A8= | 2.1119E−01 | −4.5703E−02 | 4.5503E−02 | −9.9325E−02 | −4.1123E−02 |
| A10= | −4.1111E−01 | 3.3097E−01 | −3.0512E−02 | 3.6074E−02 | 1.2336E−02 |
| A12= | 7.2733E−01 | −3.7264E−01 | −1.0154E−02 | −7.7153E−03 | −2.3345E−03 |
| A14= | −3.8318E−01 | 2.0376E−01 | 1.1200E−02 | 8.8412E−04 | 2.5005E−04 |
| A16= | — | −7.2624E−02 | −2.2002E−03 | −4.1850E−05 | −1.1151E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.14 | T45/T34 | 3.29 |
| Fno | 2.69 | ΣCT/T45 | 1.84 |
| HFOV [deg.] | 32.3 | ΣAT/T45 | 1.76 |
| FOV [deg.] | 64.6 | BL/T45 | 0.80 |
| V2 + V3 + V4 | 78.24 | TL/ImgH | 1.48 |
| V3 | 20.40 | TL/[f × tan(FOV)] | 0.45 |
| CT1/CT2 | 2.53 | (R9 + R10)/(R9 − R10) | −0.67 |
| CT1/CT3 | 1.77 | |f5/f3| + |f5/f4| | 0.35 |
| CT1/CT4 | 1.96 | |f1|/|f2| | 0.63 |
| CT1/CT5 | 1.17 | |f1|/|f5| | 0.58 |
| T45/T12 | 8.06 | (f × ImgH)/[TL × (f − TL)] | 10.86 |
| T45/T23 | 3.04 | — | — |

5th Embodiment

Figure 9:
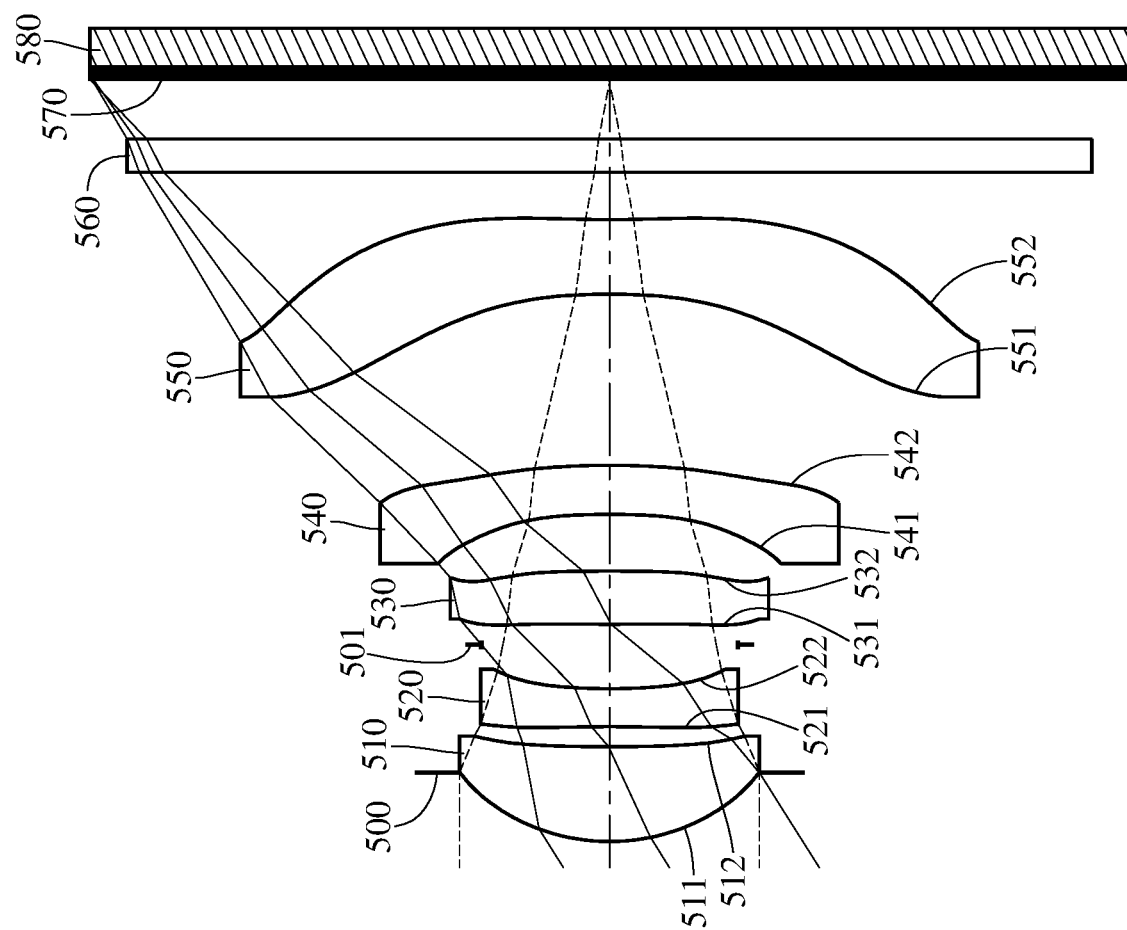
FIG. 9 is a schematic view of an image capturing unit according to the 5th embodiment of the present disclosure.
Figure 10:
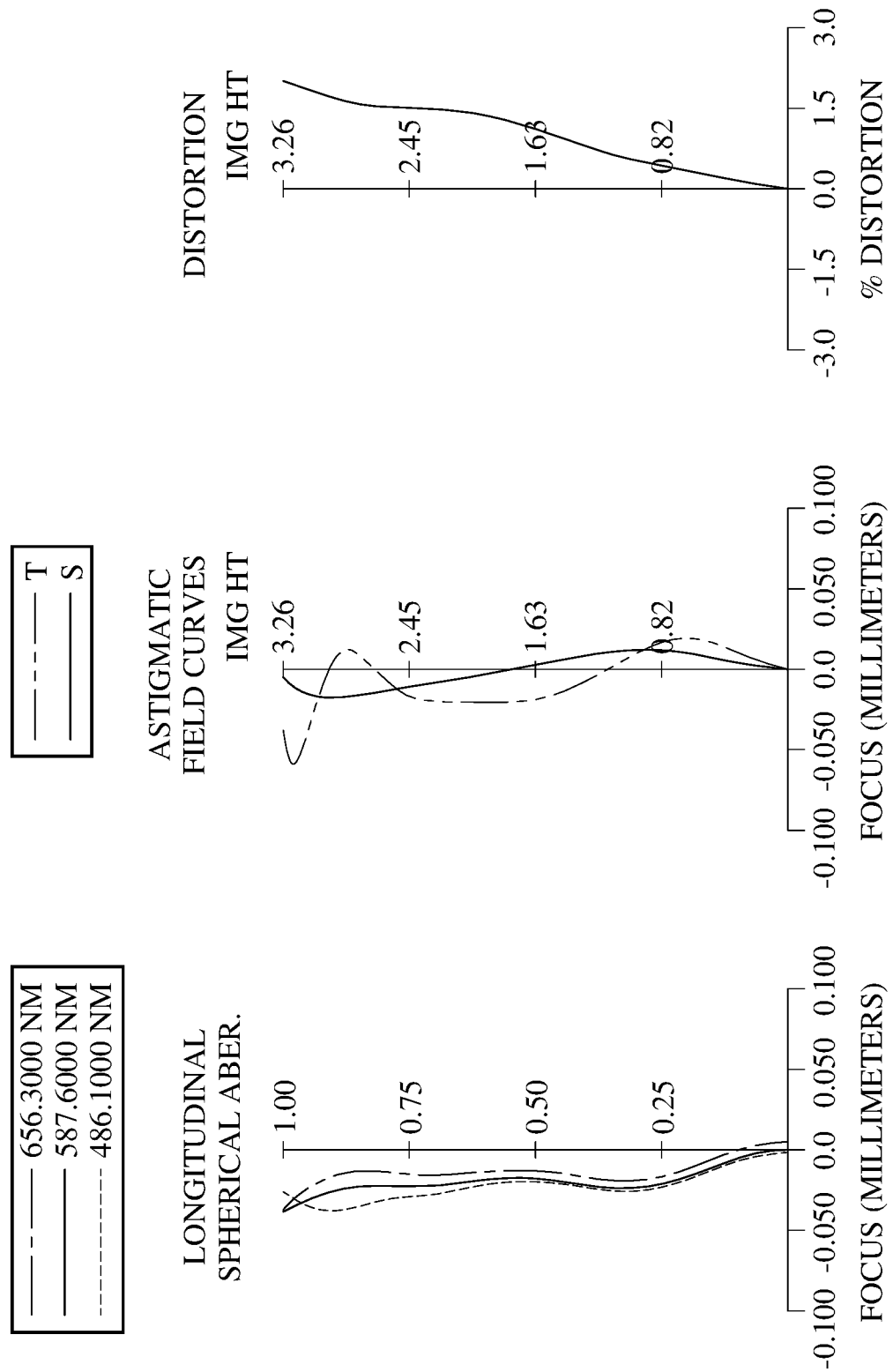
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens system (its reference numeral is omitted) of the present disclosure and an image sensor 580. The imaging lens system includes, in order from an object side to an image side, an aperture stop 500, a first lens element 510, a second lens element 520, a stop 501, a third lens element 530, a fourth lens element 540, a fifth lens element 550, an IR-cut filter 560 and an image surface 570. The imaging lens system includes five lens elements (510, 520, 530, 540 and 550) with no additional lens element disposed between each of the adjacent five lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric. Each of the object-side surface 531 and the image-side surface 532 of the third lens element 530 has at least one inflection point. The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The image-side surface 542 of the fourth lens element 540 has at least one inflection point.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. Each of the object-side surface 551 and the image-side surface 552 of the fifth lens element 550 has at least one inflection point.

The IR-cut filter 560 is made of glass material and located between the fifth lens element 550 and the image surface 570, and will not affect the focal length of the imaging lens system. The image sensor 580 is disposed on or near the image surface 570 of the imaging lens system.

The detailed optical data of the 5th embodiment are shown in Table 9 and the aspheric surface data are shown in Table 10 below.

TABLE 9

5th Embodiment
f = 5.09 mm, Fno = 2.69, HFOV = 32.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.435 | | | | |
| 2 | Lens 1 | 1.294 | (ASP) | 0.599 | Plastic | 1.545 | 56.0 | 2.63 |
| 3 | | 11.077 | (ASP) | 0.127 | | | | |
| 4 | Lens 2 | −9.827 | (ASP) | 0.240 | Plastic | 1.660 | 20.4 | −4.28 |
| 5 | | 4.008 | (ASP) | 0.278 | | | | |
| 6 | Stop | Plano | | 0.129 | | | | |
| 7 | Lens 3 | 13.788 | (ASP) | 0.336 | Plastic | 1.660 | 20.4 | 16.01 |
| 8 | | −44.780 | (ASP) | 0.359 | | | | |
| 9 | Lens 4 | −5.077 | (ASP) | 0.310 | Plastic | 1.566 | 37.4 | −179.96 |
| 10 | | −5.461 | (ASP) | 1.082 | | | | |
| 11 | Lens 5 | −4.338 | (ASP) | 0.471 | Plastic | 1.544 | 56.0 | −4.92 |
| 12 | | 7.263 | (ASP) | 0.300 | | | | |
| 13 | IR-cut Filter | Plano | | 0.210 | Glass | 1.517 | 64.2 | — |
| 14 | | Plano | | 0.376 | | | | |
| 15 | Image | Plano | | — | | | | |

Note:
Reference wavelength is 587.6 nm (d-line).
An effective radius of the image-side surface 522 (Surface 5) is 0.730 mm.
An effective radius of the stop 501 (Surface 6) is 0.810 mm.

TABLE 10

Aspheric Coefficients

| Surface # | 2 | 3 | 4 | 5 | 7 |
|---|---|---|---|---|---|
| k= | −1.4065E−01 | −9.8143E+01 | 7.5471E+01 | 9.8211E+00 | 2.0568E+00 |
| A4= | 5.4645E−03 | −6.4288E−03 | 6.6345E−02 | 3.6290E−02 | −1.8011E−01 |
| A6= | 3.9073E−02 | 3.6556E−01 | 4.9952E−01 | 7.8390E−01 | 1.8313E−01 |
| A8= | −2.8221E−02 | −1.0488E+00 | −1.7520E+00 | −3.1167E+00 | −3.2459E−01 |
| A10= | 3.4461E−03 | 1.6999E+00 | 3.4478E+00 | 7.8149E+00 | 1.0244E+00 |
| A12= | 4.4285E−02 | −1.0251E+00 | −3.2579E+00 | −9.5704E+00 | −9.3237E−01 |
| A14= | — | — | 9.5517E−01 | 4.4723E+00 | 2.4431E−01 |

| Surface # | 8 | 9 | 10 | 11 | 12 |
|---|---|---|---|---|---|
| k= | 7.8192E+01 | 8.1141E+00 | −2.8560E+00 | −1.6756E+01 | 6.6646E+00 |
| A4= | −2.1998E−01 | −1.7678E−01 | −3.2470E−02 | −1.6039E−01 | −1.5049E−01 |
| A6= | 3.4738E−02 | −2.6233E−02 | −5.1734E−02 | 1.1722E−01 | 8.7396E−02 |
| A8= | 2.0911E−01 | −2.1901E−02 | 1.6184E−01 | −6.0843E−02 | −4.0851E−02 |
| A10= | −2.5477E−01 | 3.6756E−01 | −1.0578E−01 | 2.1812E−02 | 1.2407E−02 |
| A12= | 4.3813E−01 | −3.9377E−01 | 1.1664E−02 | −4.6780E−03 | −2.3592E−03 |
| A14= | −2.3942E−01 | 1.4661E−01 | 8.9719E−03 | 5.3600E−04 | 2.5107E−04 |
| A16= | — | −2.5763E−02 | −2.3099E−03 | −2.5224E−05 | −1.1079E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.09 | T45/T34 | 3.01 |
| Fno | 2.69 | ΣCT/T45 | 1.81 |
| HFOV [deg.] | 32.3 | ΣAT/T45 | 1.83 |
| FOV [deg.] | 64.6 | BL/T45 | 0.82 |
| V2 + V3 + V4 | 78.24 | TL/ImgH | 1.48 |

-continued

| 5th Embodiment | | | |
|---|---|---|---|
| V3 | 20.40 | TL/[f × tan(FOV)] | 0.45 |
| CT1/CT2 | 2.50 | (R9 + R10)/(R9 − R10) | −0.25 |
| CT1/CT3 | 1.78 | |f5/f3| + |f5/f4| | 0.33 |
| CT1/CT4 | 1.93 | |f1|/|f2| | 0.61 |
| CT1/CT5 | 1.27 | |f1|/|f5| | 0.53 |
| T45/T12 | 8.52 | (f × ImgH)/[TL × (f − TL)] | 12.65 |
| T45/T23 | 2.66 | — | — |

6th Embodiment

Figure 11:
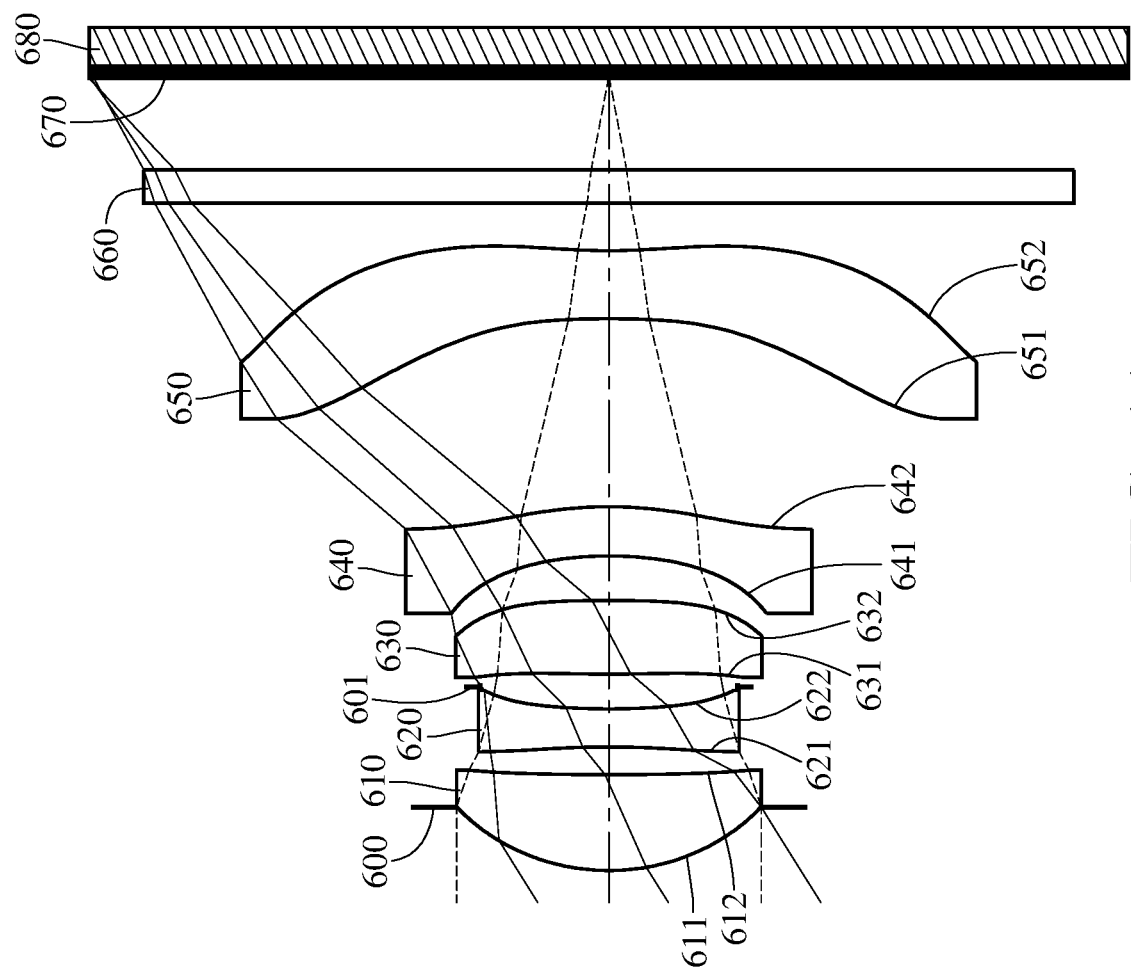
FIG. 11 is a schematic view of an image capturing unit according to the 6th embodiment of the present disclosure.
Figure 12:
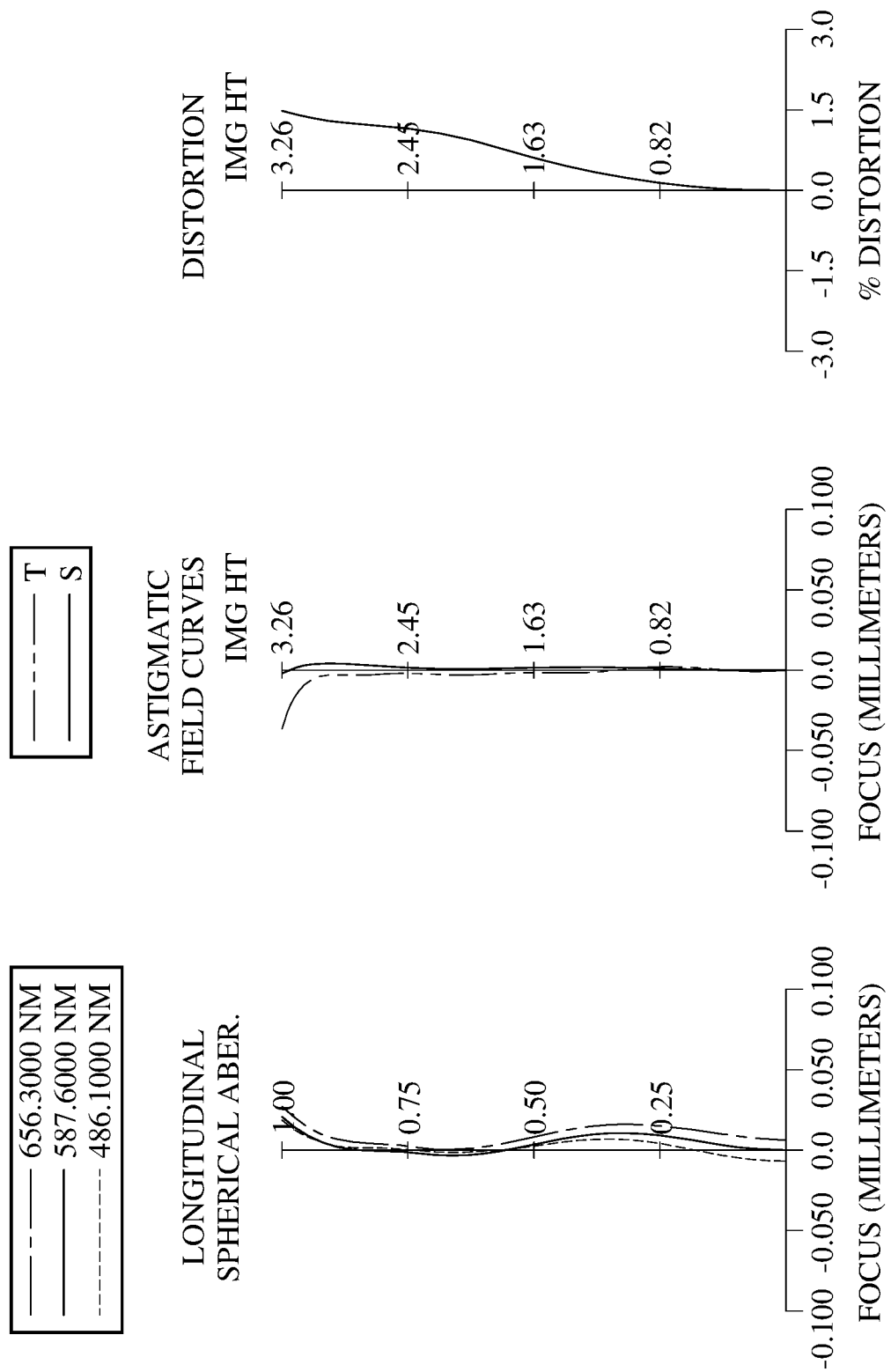
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens system (its reference numeral is omitted) of the present disclosure and an image sensor 680. The imaging lens system includes, in order from an object side to an image side, an aperture stop 600, a first lens element 610, a second lens element 620, a stop 601, a third lens element 630, a fourth lens element 640, a fifth lens element 650, an IR-cut filter 660 and an image surface 670. The imaging lens system includes five lens elements (610, 620, 630, 640 and 650) with no additional lens element disposed between each of the adjacent five lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The object-side surface 631 of the third lens element 630 has at least one inflection point.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. The image-side surface 642 of the fourth lens element 640 has at least one inflection point.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. Each of the object-side surface 651 and the image-side surface 652 of the fifth lens element 650 has at least one inflection point.

The IR-cut filter 660 is made of glass material and located between the fifth lens element 650 and the image surface 670, and will not affect the focal length of the imaging lens system. The image sensor 680 is disposed on or near the image surface 670 of the imaging lens system.

The detailed optical data of the 6th embodiment are shown in Table 11 and the aspheric surface data are shown in Table 12 below.

TABLE 11

6th Embodiment
f = 5.14 mm, Fno = 2.68, HFOV = 32.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.398 | | | | |
| 2 | Lens 1 | 1.371 | (ASP) | 0.604 | Plastic | 1.545 | 56.0 | 2.71 |
| 3 | | 16.603 | (ASP) | 0.175 | | | | |
| 4 | Lens 2 | −5.788 | (ASP) | 0.240 | Plastic | 1.660 | 20.4 | −3.78 |
| 5 | | 4.460 | (ASP) | 0.138 | | | | |
| 6 | Stop | Plano | | 0.081 | | | | |
| 7 | Lens 3 | 8.345 | (ASP) | 0.464 | Plastic | 1.660 | 20.4 | 7.91 |
| 8 | | −13.642 | (ASP) | 0.281 | | | | |
| 9 | Lens 4 | −2.433 | (ASP) | 0.310 | Plastic | 1.614 | 26.0 | −111.08 |
| 10 | | −2.646 | (ASP) | 1.185 | | | | |
| 11 | Lens 5 | −7.886 | (ASP) | 0.429 | Plastic | 1.544 | 56.0 | −4.60 |
| 12 | | 3.732 | (ASP) | 0.300 | | | | |
| 13 | IR-cut Filter | Plano | | 0.210 | Glass | 1.517 | 64.2 | — |
| 14 | | Plano | | 0.574 | | | | |
| 15 | Image | Plano | | — | | | | |

Note:
Reference wavelength is 587.6 nm (d-line).
An effective radius of the image-side surface 622 (Surface 5) is 0.785 mm.
An effective radius of the stop 601 (Surface 6) is 0.810 mm.

TABLE 12

Aspheric Coefficients

| Surface # | 2 | 3 | 4 | 5 | 7 |
|---|---|---|---|---|---|
| k= | −2.0812E−01 | −9.8386E+01 | 2.6937E+01 | 2.1955E+01 | −3.0400E+00 |
| A4= | 1.2495E−02 | −9.8390E−03 | 1.5224E−02 | −5.6507E−02 | −1.9569E−01 |

TABLE 12-continued

| Aspheric Coefficients | | | | |
|---|---|---|---|---|
| A6= | 1.4591E−02 | −1.4241E−04 | 2.3389E−01 | 3.4543E−01 | 1.4675E−01 |
| A8= | −1.9011E−02 | 9.8055E−02 | −1.9196E−01 | −2.2855E−01 | −6.2571E−02 |
| A10= | 2.7664E−02 | −8.3643E−02 | — | — | — |

| Surface # | 8 | 9 | 10 | 11 | 12 |
|---|---|---|---|---|---|
| k= | 1.2284E+01 | 1.7585E−01 | −2.1162E+01 | 1.5219E+00 | −4.6613E+01 |
| A4= | −2.0164E−01 | −1.2508E−01 | −1.2702E−01 | −1.8255E−01 | −1.1119E−01 |
| A6= | 1.4233E−02 | 8.4626E−02 | 2.5560E−01 | 1.2692E−01 | 5.3147E−02 |
| A8= | −3.6194E−02 | −1.2865E−01 | −1.8394E−01 | −5.1987E−02 | −1.8335E−02 |
| A10= | — | 1.3941E−02 | 6.5049E−02 | 1.3142E−02 | 3.8481E−03 |
| A12= | — | — | −9.5018E−03 | −1.8468E−03 | −4.5722E−04 |
| A14= | — | — | — | 1.2315E−04 | 2.1118E−05 |
| A16= | — | — | — | −2.3788E−06 | 4.4807E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.14 | T45/T34 | 4.22 |
| Fno | 2.68 | ΣCT/T45 | 1.73 |
| HFOV [deg.] | 32.0 | ΣAT/T45 | 1.57 |
| FOV [deg.] | 64.0 | BL/T45 | 0.92 |
| V2 + V3 + V4 | 66.77 | TL/ImgH | 1.53 |
| V3 | 20.40 | TL/[f × tan(FOV)] | 0.47 |
| CT1/CT2 | 2.52 | (R9 + R10)/(R9 − R10) | 0.36 |
| CT1/CT3 | 1.30 | |f5/f3| + |f5/f4| | 0.62 |
| CT1/CT4 | 1.95 | |f1|/|f2| | 0.72 |
| CT1/CT5 | 1.41 | |f1|/|f5| | 0.59 |
| T45/T12 | 6.77 | (f × ImgH)/[TL × (f − TL)] | 22.62 |
| T45/T23 | 5.41 | — | — |

7th Embodiment

Figure 13:
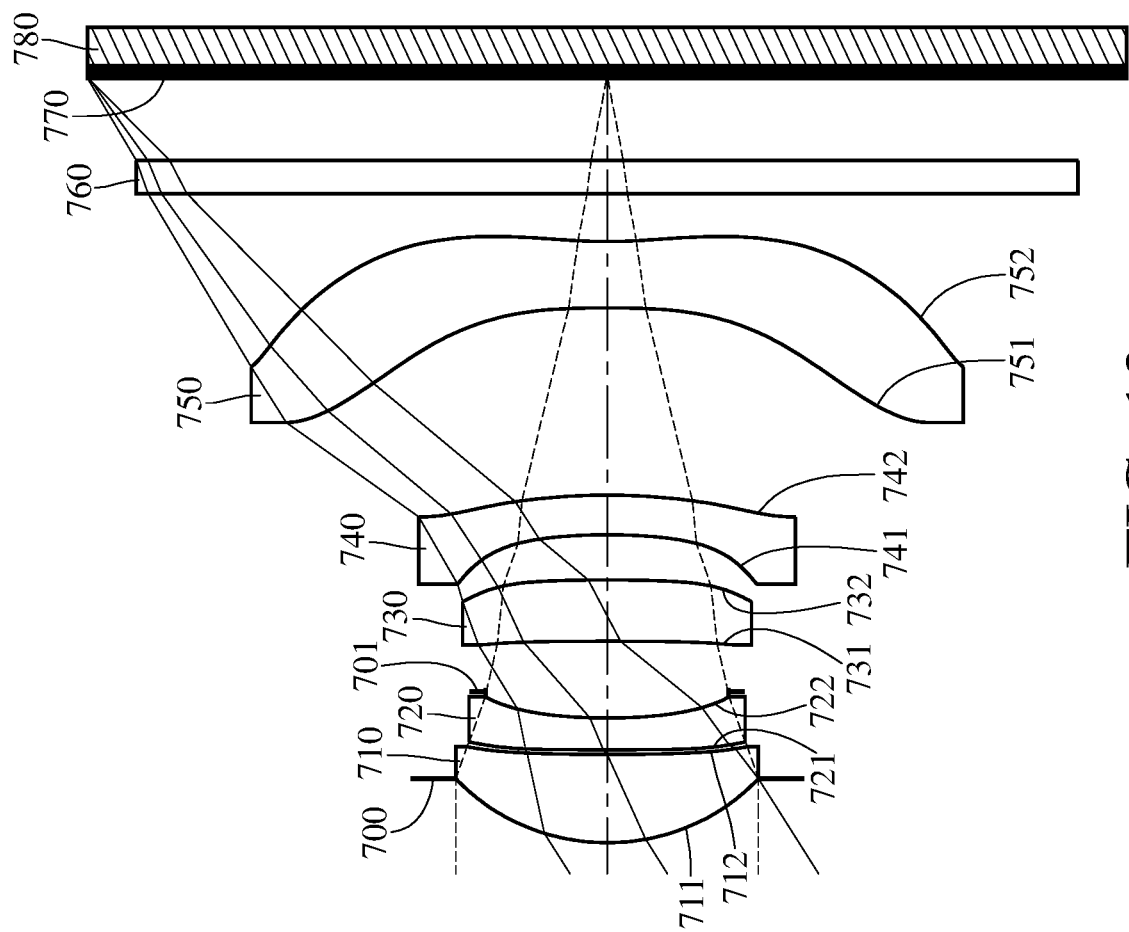
FIG. 13 is a schematic view of an image capturing unit according to the 7th embodiment of the present disclosure.
Figure 14:
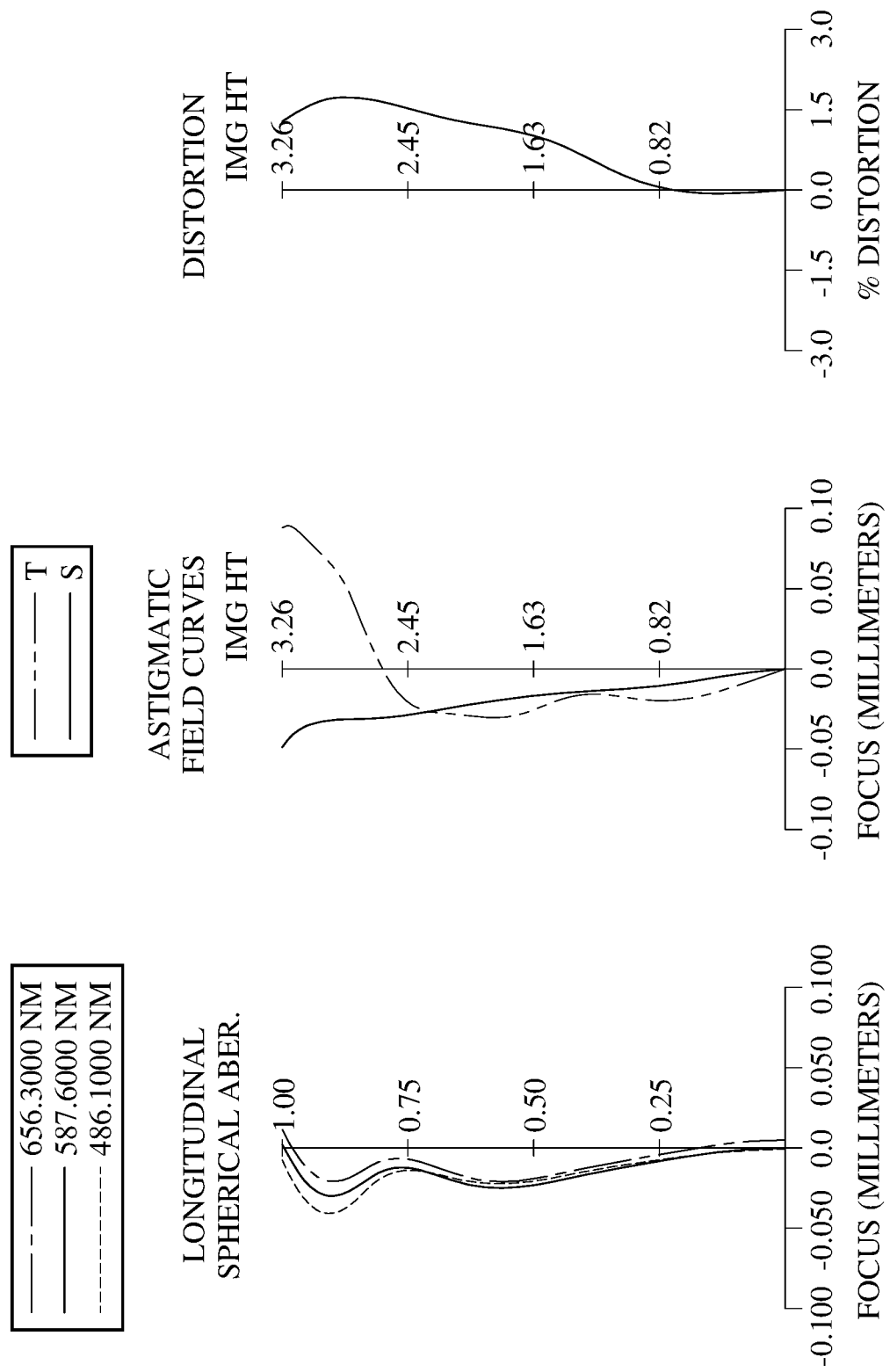
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens system (its reference numeral is omitted) of the present disclosure and an image sensor 780. The imaging lens system includes, in order from an object side to an image side, an aperture stop 700, a first lens element 710, a second lens element 720, a stop 701, a third lens element 730, a fourth lens element 740, a fifth lens element 750, an IR-cut filter 760 and an image surface 770. The imaging lens system includes five lens elements (710, 720, 730, 740 and 750) with no additional lens element disposed between each of the adjacent five lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric. Each of the object-side surface 731 and the image-side surface 732 of the third lens element 730 has at least one inflection point.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. The image-side surface 742 of the fourth lens element 740 has at least one inflection point.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. Each of the object-side surface 751 and the image-side surface 752 of the fifth lens element 750 has at least one inflection point.

The IR-cut filter 760 is made of glass material and located between the fifth lens element 750 and the image surface 770, and will not affect the focal length of the imaging lens system. The image sensor 780 is disposed on or near the image surface 770 of the imaging lens system.

The detailed optical data of the 7th embodiment are shown in Table 13 and the aspheric surface data are shown in Table 14 below.

TABLE 13

7th Embodiment
f = 5.12 mm, Fno = 2.69, HFOV = 32.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.404 | | | | |
| 2 | Lens 1 | 1.345 | (ASP) | 0.556 | Plastic | 1.545 | 56.1 | 2.66 |
| 3 | | 15.894 | (ASP) | 0.030 | | | | |
| 4 | Lens 2 | 282.311 | (ASP) | 0.200 | Plastic | 1.660 | 20.4 | −5.49 |
| 5 | | 3.574 | (ASP) | 0.166 | | | | |
| 6 | Stop | Plano | | 0.318 | | | | |
| 7 | Lens 3 | −50.672 | (ASP) | 0.386 | Plastic | 1.660 | 20.4 | 28.87 |
| 8 | | −13.888 | (ASP) | 0.285 | | | | |
| 9 | Lens 4 | −3.683 | (ASP) | 0.250 | Plastic | 1.614 | 26.0 | −170.36 |
| 10 | | −3.916 | (ASP) | 1.180 | | | | |
| 11 | Lens 5 | −9.800 | (ASP) | 0.419 | Plastic | 1.544 | 56.0 | −4.32 |
| 12 | | 3.140 | (ASP) | 0.300 | | | | |
| 13 | IR-cut Filter | Plano | | 0.210 | Glass | 1.517 | 64.2 | — |
| 14 | | Plano | | 0.518 | | | | |
| 15 | Image | Plano | | — | | | | |

Note:
Reference wavelength is 587.6 nm (d-line).
An effective radius of the stop 701 (Surface 6) is 0.765 mm.
An effective radius of the image-side surface 732 (Surface 8) is 0.910 mm.

TABLE 14

Aspheric Coefficients

| Surface # | 2 | 3 | 4 | 5 | 7 |
|---|---|---|---|---|---|
| k= | −2.4597E−01 | −8.1872E+01 | 9.0000E+01 | −2.5100E+00 | −9.3353E+01 |
| A4= | 4.3306E−03 | −8.1484E−03 | 5.2908E−02 | 9.4133E−02 | −4.8530E−02 |
| A6= | 5.2044E−02 | 1.5824E−01 | 1.5771E−01 | 3.1220E−01 | 2.7219E−01 |
| A8= | −7.4108E−02 | −2.9077E−01 | −4.7553E−01 | −1.5611E+00 | −2.2489E+00 |
| A10= | 6.6749E−02 | 3.9546E−01 | 9.0698E−01 | 4.3511E+00 | 7.9335E+00 |
| A12= | −9.1206E−03 | −2.2835E−01 | −8.3696E−01 | −5.7906E+00 | −1.4227E+01 |
| A14= | — | — | 2.6331E−01 | 3.1195E+00 | 1.2642E+01 |
| A16= | — | — | — | — | −4.3166E+00 |

| Surface # | 8 | 9 | 10 | 11 | 12 |
|---|---|---|---|---|---|
| k= | 2.5627E+01 | −8.3291E+01 | −1.2864E+01 | −8.3947E+01 | −4.5897E+01 |
| A4= | −8.8092E−02 | −2.4582E−01 | −8.3270E−03 | −2.8589E−01 | −1.3949E−01 |
| A6= | 8.8941E−02 | 3.3663E−01 | 8.6702E−02 | 3.2146E−01 | 1.0162E−01 |
| A8= | −1.0442E+00 | −1.2468E+00 | −4.9679E−01 | −2.9037E−01 | −5.4255E−02 |
| A10= | 2.3972E+00 | 1.2656E+00 | 8.0421E−01 | 1.6859E−01 | 1.2277E−02 |
| A12= | −2.5362E+00 | 2.4226E−02 | −5.4771E−01 | −5.8959E−02 | 2.1728E−03 |
| A14= | 9.5069E−01 | −1.0172E+00 | 1.6683E−01 | 1.2156E−02 | −2.1612E−03 |
| A16= | 1.1482E−01 | 5.7437E−01 | −1.7896E−02 | −1.3652E−03 | 5.8597E−04 |
| A18= | — | — | — | 6.4505E−05 | −7.4752E−05 |
| A20= | — | — | — | — | 3.8163E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.12 | T45/T34 | 4.14 |
| Fno | 2.69 | ΣCT/T45 | 1.53 |

-continued

| 7th Embodiment | | | |
|---|---|---|---|
| HFOV [deg.] | 32.3 | ΣAT/T45 | 1.68 |
| FOV [deg.] | 64.6 | BL/T45 | 0.87 |
| V2 + V3 + V4 | 66.77 | TL/ImgH | 1.48 |
| V3 | 20.40 | TL/[f × tan(FOV)] | 0.45 |
| CT1/CT2 | 2.78 | (R9 + R10)/(R9 − R10) | 0.51 |
| CT1/CT3 | 1.44 | |f5/f3| + |f5/f4| | 0.18 |
| CT1/CT4 | 2.22 | |f1|/|f2| | 0.49 |
| CT1/CT5 | 1.33 | |f1|/|f5| | 0.62 |
| T45/T12 | 39.33 | (f × ImgH)/[TL × (f − TL)] | 11.41 |
| T45/T23 | 2.44 | — | — |

8th Embodiment

Figure 15:
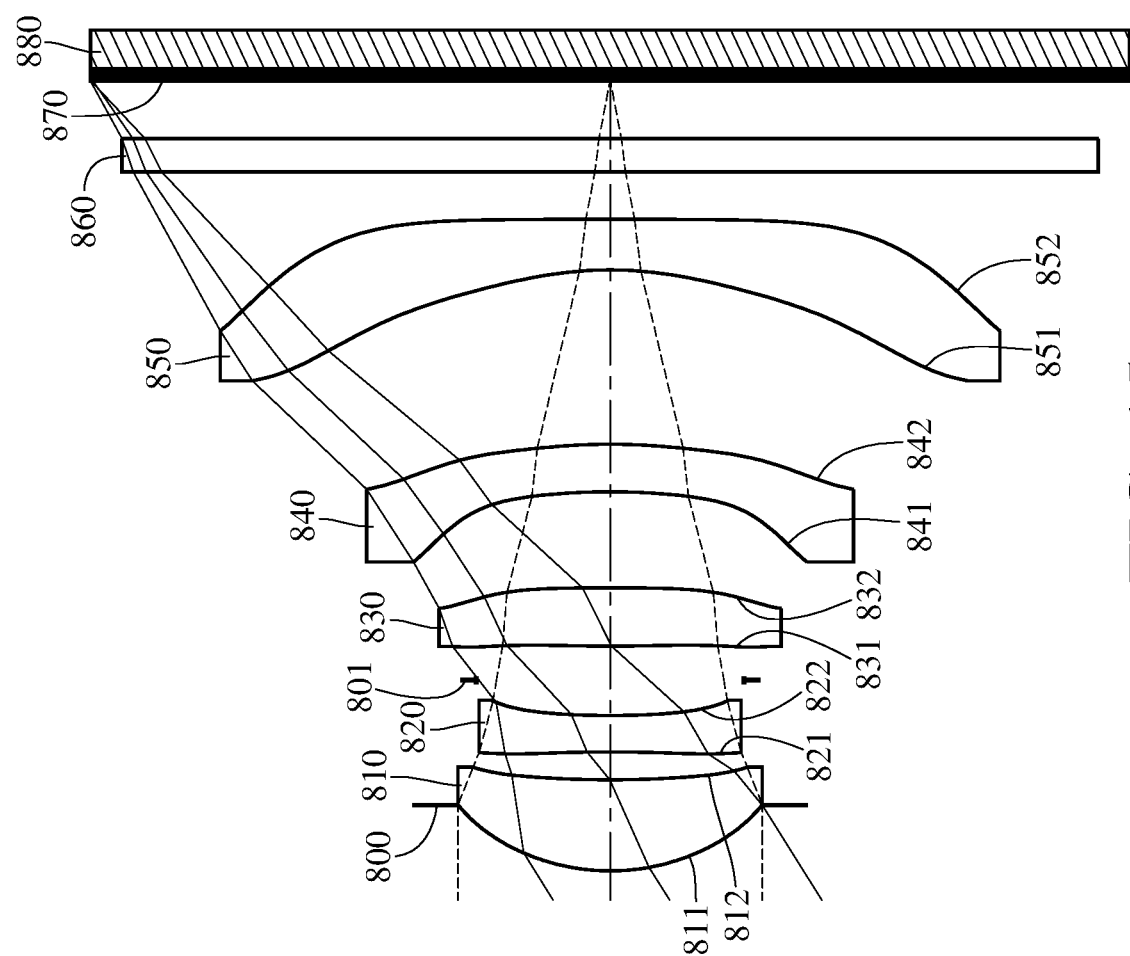
FIG. 15 is a schematic view of an image capturing unit according to the 8th embodiment of the present disclosure.
Figure 16:
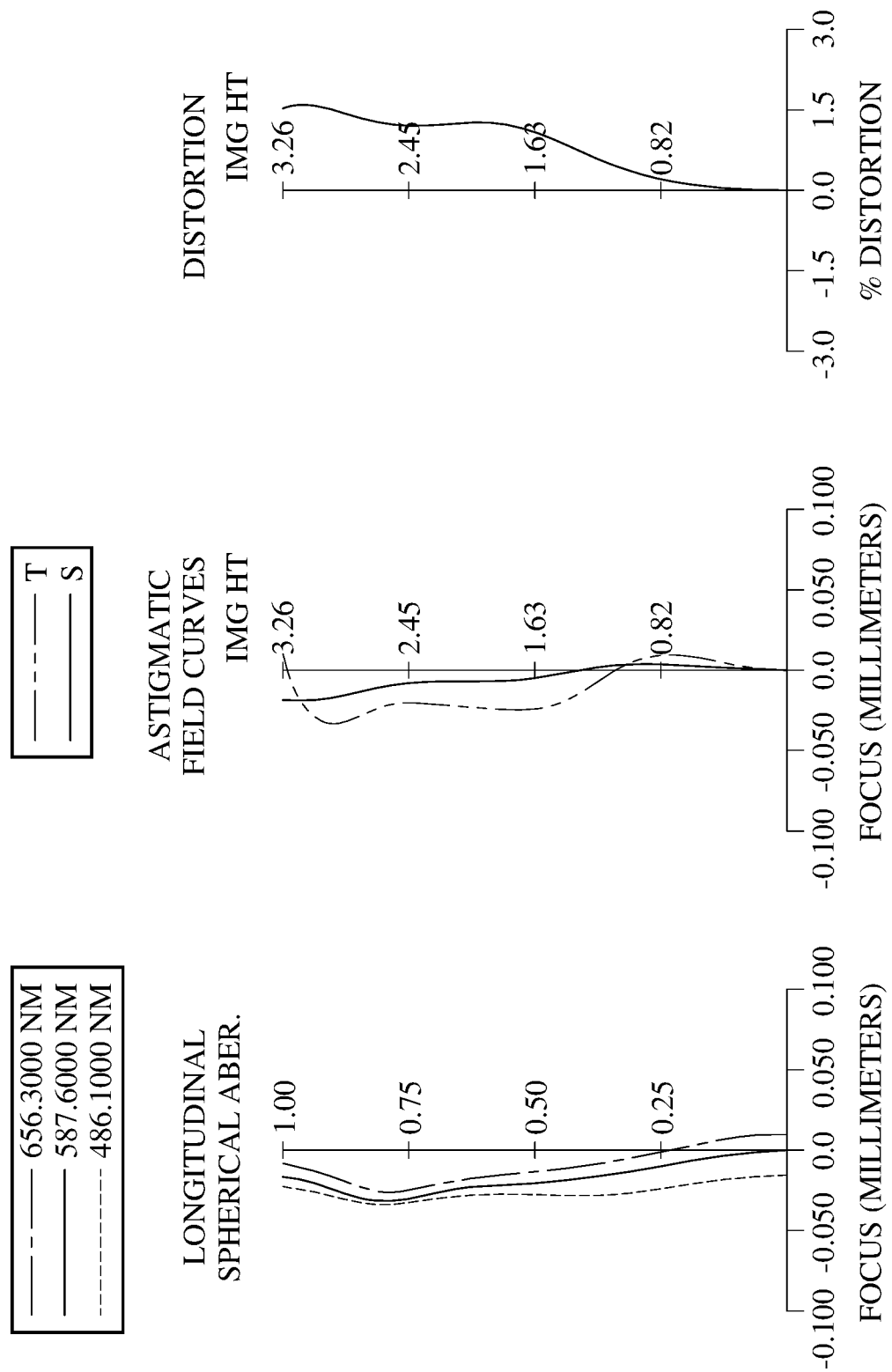
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens system (its reference numeral is omitted) of the present disclosure and an image sensor 880. The imaging lens system includes, in order from an object side to an image side, an aperture stop 800, a first lens element 810, a second lens element 820, a stop 801, a third lens element 830, a fourth lens element 840, a fifth lens element 850, an IR-cut filter 860 and an image surface 870. The imaging lens system includes five lens elements (810, 820, 830, 840 and 850) with no additional lens element disposed between each of the adjacent five lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. Each of the object-side surface 831 and the image-side surface 832 of the third lens element 830 has at least one inflection point.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. Each of the object-side surface 841 and the image-side surface 842 of the fourth lens element 840 has at least one inflection point.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. Each of the object-side surface 851 and the image-side surface 852 of the fifth lens element 850 has at least one inflection point.

The IR-cut filter 860 is made of glass material and located between the fifth lens element 850 and the image surface 870, and will not affect the focal length of the imaging lens system. The image sensor 880 is disposed on or near the image surface 870 of the imaging lens system.

The detailed optical data of the 8th embodiment are shown in Table 15 and the aspheric surface data are shown in Table 16 below.

TABLE 15

8th Embodiment
f = 5.16 mm, Fno = 2.69, HFOV = 32.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.414 | | | | |
| 2 | Lens 1 | 1.391 | (ASP) | 0.575 | Plastic | 1.545 | 56.1 | 3.09 |
| 3 | | 6.814 | (ASP) | 0.176 | | | | |
| 4 | Lens 2 | −8.767 | (ASP) | 0.230 | Plastic | 1.669 | 19.5 | −5.16 |
| 5 | | 5.752 | (ASP) | 0.223 | | | | |
| 6 | Stop | Plano | | 0.215 | | | | |
| 7 | Lens 3 | 9.736 | (ASP) | 0.368 | Plastic | 1.669 | 19.5 | 11.80 |
| 8 | | −41.003 | (ASP) | 0.607 | | | | |
| 9 | Lens 4 | −4.354 | (ASP) | 0.300 | Plastic | 1.584 | 28.2 | 32.75 |
| 10 | | −3.637 | (ASP) | 1.101 | | | | |
| 11 | Lens 5 | −2.304 | (ASP) | 0.320 | Plastic | 1.534 | 55.9 | −4.37 |
| 12 | | −209.432 | (ASP) | 0.300 | | | | |
| 13 | IR-cut Filter | Plano | | 0.210 | Glass | 1.517 | 64.2 | — |
| 14 | | Plano | | 0.362 | | | | |
| 15 | Image | Plano | | — | | | | |

Note:
Reference wavelength is 587.6 nm (d-line).
An effective radius of the stop 801 (Surface 6) is 0.845 mm.
An effective radius of the image-side surface 842 (Surface 10) is 1.535 mm.

TABLE 16

Aspheric Coefficients

| Surface # | 2 | 3 | 4 | 5 | 7 |
|---|---|---|---|---|---|
| k= | 6.9418E−01 | 2.5285E+00 | 8.8514E+01 | −4.5209E+00 | −9.8990E+01 |
| A4= | −1.8450E−02 | −6.8816E−03 | 4.2646E−02 | 6.9756E−02 | −1.0462E−01 |

TABLE 16-continued

| Aspheric Coefficients | | | | | |
|---|---|---|---|---|---|
| A6= | −3.7976E−02 | 1.7672E−02 | 1.2185E−01 | 1.3342E−01 | −1.0122E−02 |
| A8= | 2.5565E−02 | 7.1381E−02 | −2.2423E−02 | 7.5233E−02 | 1.4065E−01 |
| A10= | −2.3207E−02 | −2.4794E−02 | 5.8855E−03 | −1.1025E−01 | −2.2459E−01 |
| A12= | — | 2.1316E−02 | −4.8650E−02 | — | 2.7797E−01 |
| A14= | — | — | — | — | −1.2314E−01 |

| Surface# | 8 | 9 | 10 | 11 | 12 |
|---|---|---|---|---|---|
| k= | −9.9000E+01 | 0.0000E+00 | −1.7008E+01 | −1.7188E+00 | 1.6216E−01 |
| A4= | −1.1273E−01 | 1.0339E−02 | 4.7152E−02 | 4.8190E−02 | −8.1263E−03 |
| A6= | −1.0312E−01 | −6.1192E−02 | 2.7090E−02 | −3.7334E−02 | 3.8102E−03 |
| A8= | 2.6466E−01 | −1.8102E−01 | −2.3195E−01 | −1.3098E−02 | −5.3817E−03 |
| A10= | −3.5409E−01 | 1.4457E−01 | 2.4296E−01 | 5.8509E−03 | 1.8099E−03 |
| A12= | 2.8123E−01 | −1.5503E−02 | −1.1323E−01 | −1.0176E−03 | −3.1476E−04 |
| A14= | −7.8984E−02 | −4.4445E−03 | 2.6129E−02 | 7.8986E−05 | 2.9492E−05 |
| A16= | — | — | −2.4592E−03 | −2.1936E−06 | −1.1209E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.16 | T45/T34 | 1.81 |
| Fno | 2.69 | ΣCT/T45 | 1.63 |
| HFOV [deg.] | 32.0 | ΣAT/T45 | 2.11 |
| FOV [deg.] | 64.0 | BL/T45 | 0.79 |
| V2 + V3 + V4 | 67.11 | TL/ImgH | 1.53 |
| V3 | 19.45 | TL/[f × tan(FOV)] | 0.47 |
| CT1/CT2 | 2.50 | (R9 + R10)/(R9 − R10) | −1.02 |
| CT1/CT3 | 1.56 | \|f5/f3\| + \|f5/f4\| | 0.50 |
| CT1/CT4 | 1.92 | \|f1\|/\|f2\| | 0.60 |
| CT1/CT5 | 1.80 | \|f1\|/\|f5\| | 0.71 |
| T45/T12 | 6.26 | (f × ImgH)/[TL × (f − TL)] | 19.25 |
| T45/T23 | 2.51 | — | — |

9th Embodiment

Figure 17:
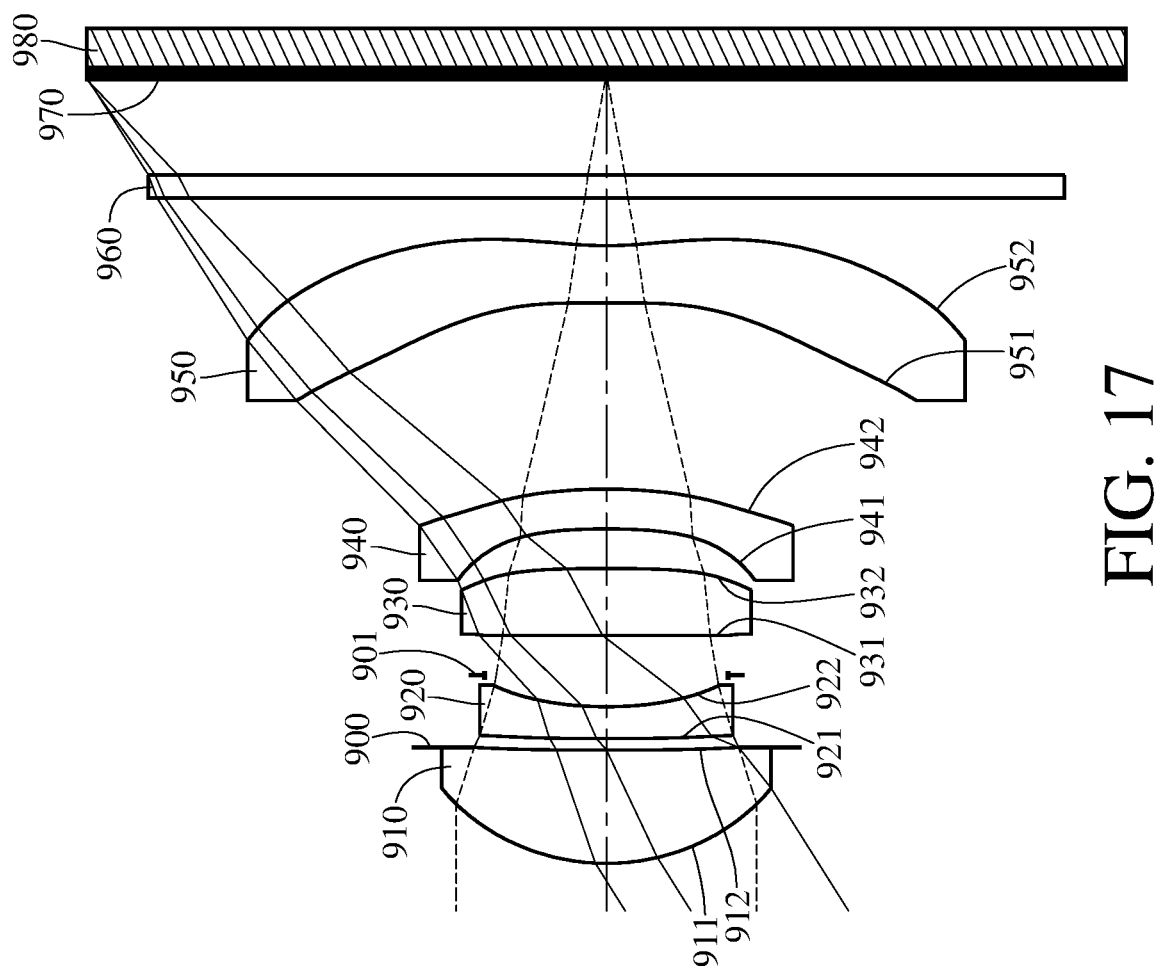
FIG. 17 is a schematic view of an image capturing unit according to the 9th embodiment of the present disclosure.
Figure 18:
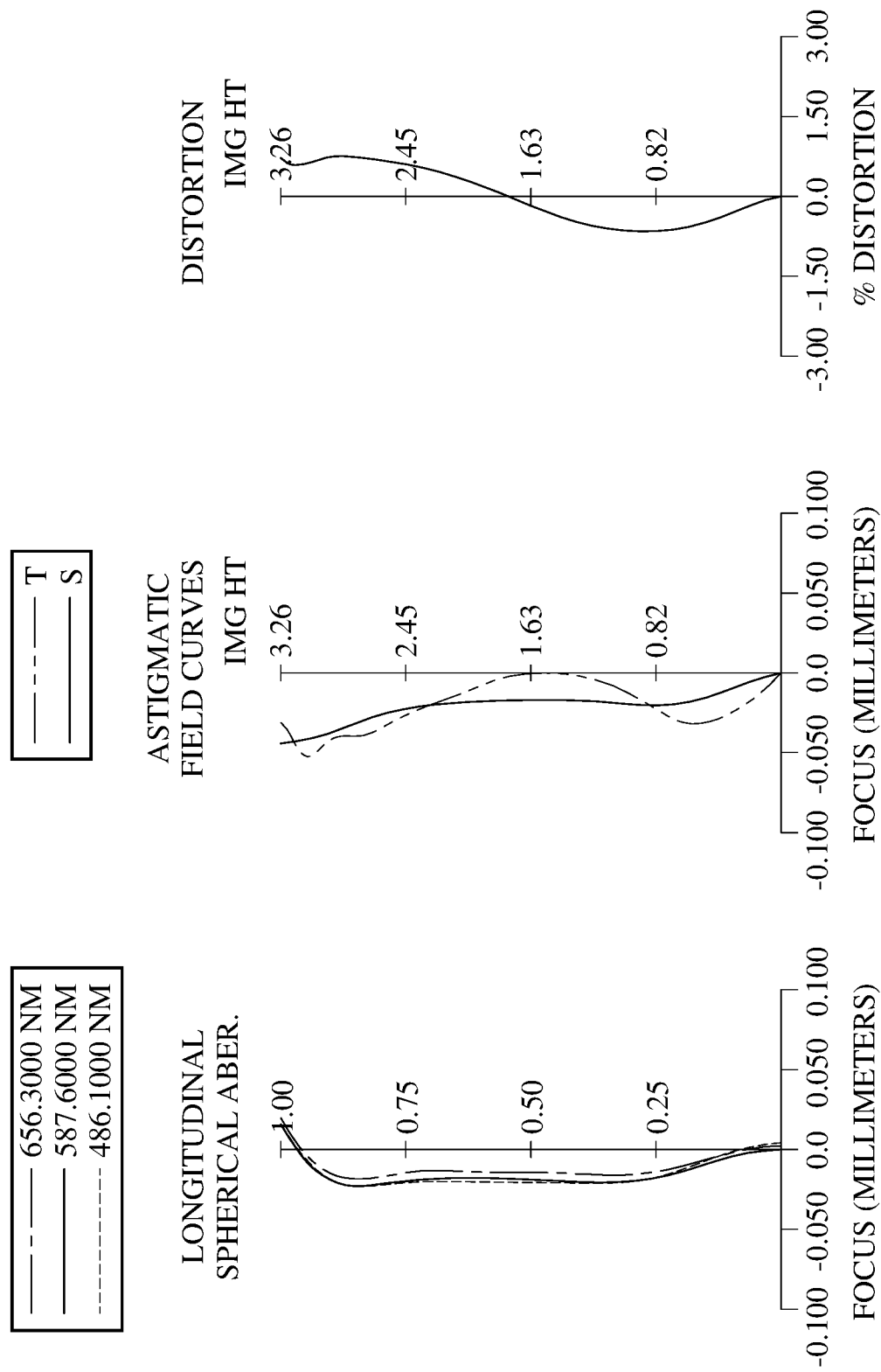
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens system (its reference numeral is omitted) of the present disclosure and an image sensor 980. The imaging lens system includes, in order from an object side to an image side, a first lens element 910, an aperture stop 900, a second lens element 920, a stop 901, a third lens element 930, a fourth lens element 940, a fifth lens element 950, an IR-cut filter 960 and an image surface 970. The imaging lens system includes five lens elements (910, 920, 930, 940 and 950) with no additional lens element disposed between each of the adjacent five lens elements.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric. Each of the object-side surface 931 and the image-side surface 932 of the third lens element 930 has at least one inflection point.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has at least one inflection point.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. Each of the object-side surface 951 and the image-side surface 952 of the fifth lens element 950 has at least one inflection point.

The IR-cut filter 960 is made of glass material and located between the fifth lens element 950 and the image surface 970, and will not affect the focal length of the imaging lens system. The image sensor 980 is disposed on or near the image surface 970 of the imaging lens system.

The detailed optical data of the 9th embodiment are shown in Table 17 and the aspheric surface data are shown in Table 18 below.

TABLE 17

9th Embodiment
f = 5.19 mm, Fno = 2.75, HFOV = 32.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.400 | (ASP) | 0.713 | Plastic | 1.545 | 56.1 | 2.54 |
| 2 | Ape. Stop | −118.552 | (ASP) | 0.072 | | | | |
| 3 | Lens 2 | 221.574 | (ASP) | 0.200 | Plastic | 1.650 | 21.5 | −3.76 |
| 4 | | 2.419 | (ASP) | 0.198 | | | | |
| 5 | Stop | Plano | | 0.250 | | | | |
| 6 | Lens 3 | 75.931 | (ASP) | 0.421 | Plastic | 1.660 | 20.4 | 21.61 |
| 7 | | −17.521 | (ASP) | 0.249 | | | | |
| 8 | Lens 4 | −4.255 | (ASP) | 0.250 | Plastic | 1.639 | 23.5 | 28.39 |
| 9 | | −3.525 | (ASP) | 1.171 | | | | |
| 10 | Lens 5 | 194.039 | (ASP) | 0.360 | Plastic | 1.544 | 55.9 | −4.42 |
| 11 | | 2.372 | (ASP) | 0.300 | | | | |
| 12 | IR-cut Filter | Plano | | 0.145 | Glass | 1.517 | 64.2 | — |
| 13 | | Plano | | 0.599 | | | | |
| 14 | Image | Plano | | — | | | | |

Note:
Reference wavelength is 587.6 nm (d-line).
An effective radius of the stop 901 (Surface 5) is 0.765 mm.
An effective radius of the image-side surface 932 (Surface 7) is 0.910 mm.

TABLE 18

Aspheric Coefficients

| Surface # | 1 | 2 | 3 | 4 | 6 |
|---|---|---|---|---|---|
| k= | −2.7311E−01 | 9.0000E+01 | −9.9000E+01 | −2.3992E+00 | −9.9000E+01 |
| A4= | −2.9171E−03 | 1.4471E−01 | 2.3247E−01 | 1.5648E−01 | −2.3558E−02 |
| A6= | 1.9887E−01 | −7.2663E−01 | −1.3458E+00 | 2.8374E−01 | −1.3527E−02 |
| A8= | −1.1341E+00 | 4.1985E+00 | 8.0133E+00 | −6.6223E+00 | −2.0239E−01 |
| A10= | 4.1214E+00 | −1.9949E+01 | −3.8649E+01 | 4.8446E+01 | 2.8177E+00 |
| A12= | −9.3186E+00 | 6.4810E+01 | 1.2774E+02 | −1.9528E+02 | −1.4154E+01 |
| A14= | 1.3268E+01 | −1.3433E+02 | −2.7153E+02 | 4.7744E+02 | 3.8219E+01 |
| A16= | −1.1528E+01 | 1.6929E+02 | 3.5301E+02 | −7.0176E+02 | −5.6511E+01 |
| A18= | 5.5924E+00 | −1.1807E+02 | −2.5501E+02 | 5.7062E+02 | 4.3454E+01 |
| A20= | −1.1614E+00 | 3.4896E+01 | 7.8281E+01 | −1.9719E+02 | −1.3573E+01 |

| Surface # | 7 | 8 | 9 | 10 | 11 |
|---|---|---|---|---|---|
| k= | 4.3185E+01 | −3.3870E+01 | −9.1959E−01 | 9.0000E+01 | −3.3505E+01 |
| A4= | −1.7637E−01 | −2.2459E−01 | −7.0411E−02 | −3.7777E−01 | −1.8115E−01 |
| A6= | 4.3792E−01 | −7.1187E−01 | −9.7671E−02 | 4.6748E−01 | 1.4923E−01 |
| A8= | −2.7063E+00 | 6.0399E+00 | 8.6347E−01 | −4.3725E−01 | −8.7695E−02 |
| A10= | 8.1051E+00 | −2.9184E+01 | −2.9281E+00 | 3.0038E−01 | 3.3003E−02 |
| A12= | −1.3616E+01 | 8.2170E+01 | 5.3991E+00 | −1.4325E−01 | −7.0632E−03 |
| A14= | 9.9880E+00 | −1.4378E+02 | −5.4669E+00 | 4.5756E−02 | 5.0241E−04 |
| A16= | 4.0515E+00 | 1.5573E+02 | 3.0279E+00 | −9.2852E−03 | 1.1240E−04 |
| A18= | −1.1520E+01 | −9.5532E+01 | −8.5154E−01 | 1.0740E−03 | −2.6993E−05 |
| A20= | 5.3787E+00 | 2.5193E+01 | 9.2873E−02 | −5.3539E−05 | 1.6971E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 5.19 | T45/T34 | 4.70 |
| Fno | 2.75 | ΣCT/T45 | 1.66 |
| HFOV [deg.] | 32.1 | ΣAT/T45 | 1.66 |

-continued

| 9th Embodiment | | | |
|---|---|---|---|
| FOV [deg.] | 64.2 | BL/T45 | 0.89 |
| V2 + V3 + V4 | 65.36 | TL/ImgH | 1.51 |
| V3 | 20.40 | TL/[f × tan(FOV)] | 0.46 |
| CT1/CT2 | 3.57 | (R9 + R10)/(R9 − R10) | 1.02 |
| CT1/CT3 | 1.69 | \|f5/f3\| + \|f5/f4\| | 0.36 |
| CT1/CT4 | 2.85 | \|f1\|/\|f2\| | 0.68 |
| CT1/CT5 | 1.98 | \|f1\|/\|f5\| | 0.58 |
| T45/T12 | 16.26 | (f × ImgH)/[TL × (f − TL)] | 13.26 |
| T45/T23 | 2.61 | — | — |

10th Embodiment

Figure 19:
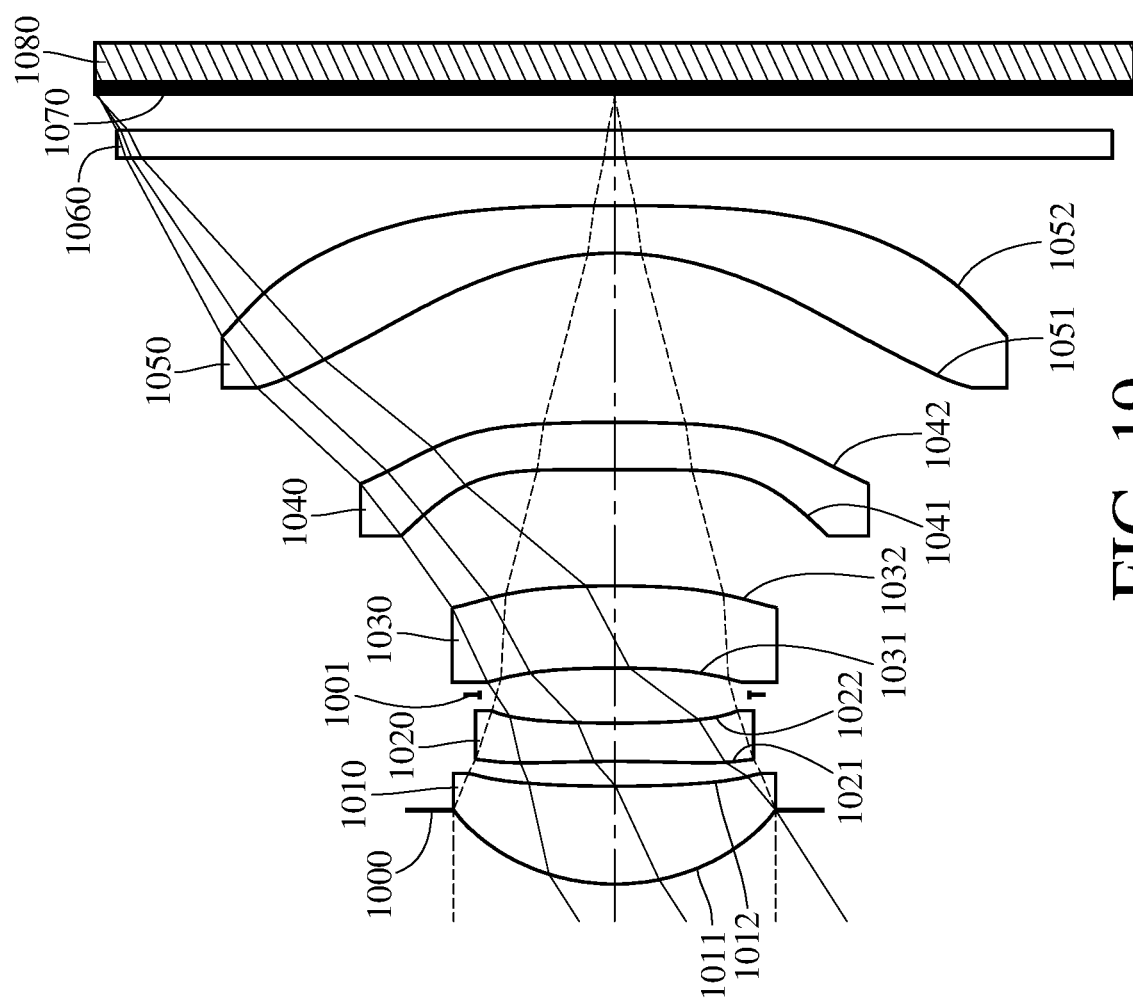
FIG. 19 is a schematic view of an image capturing unit according to the 10th embodiment of the present disclosure.

FIG. 19 is a schematic view of an image capturing unit according to the 10th embodiment of the present disclosure.

Figure 20:
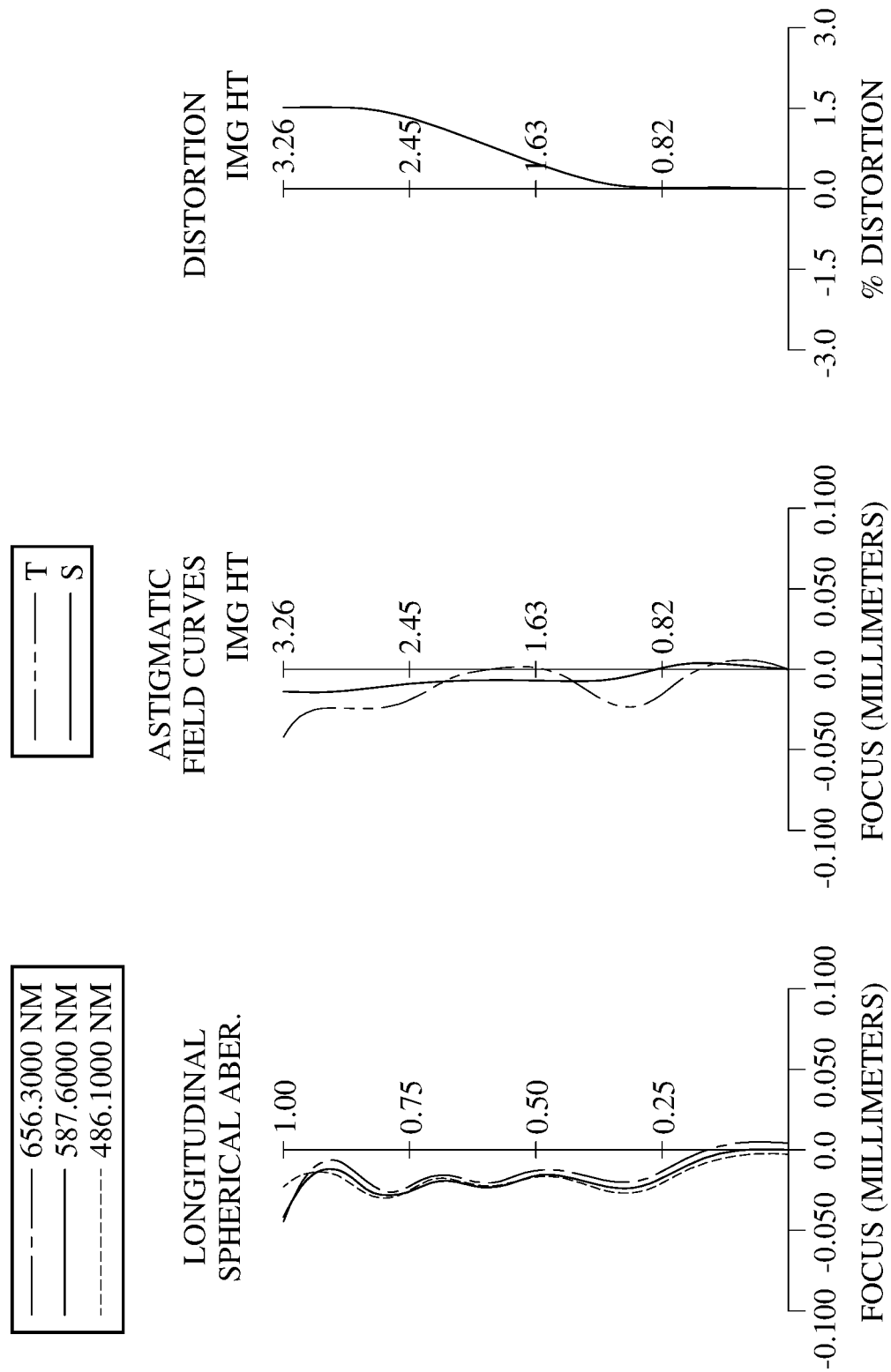
FIG. 20 shows spherical aberration curves, astigmatic field curves and a distortion curve of the image capturing unit according to the 10th embodiment.

FIG. 20 shows, in order from left to right, spherical aberration curves, astigmatic field curves and a distortion curve of the image capturing unit according to the 10th embodiment. In FIG. 19, the image capturing unit includes the imaging lens system (its reference numeral is omitted) of the present disclosure and an image sensor 1080. The imaging lens system includes, in order from an object side to an image side, an aperture stop 1000, a first lens element 1010, a second lens element 1020, a stop 1001, a third lens element 1030, a fourth lens element 1040, a fifth lens element 1050, an IR-cut filter 1060 and an image surface 1070. The imaging lens system includes five lens elements (1010, 1020, 1030, 1040 and 1050) with no additional lens element disposed between each of the adjacent five lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being concave in a paraxial region thereof and an image-side surface 1032 being convex in a paraxial region thereof. The third lens element 1030 is made of plastic material and has the object-side surface 1031 and the image-side surface 1032 being both aspheric. Each of the object-side surface 1031 and the image-side surface 1032 of the third lens element 1030 has at least one inflection point.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric. Each of the object-side surface 1041 and the image-side surface 1042 of the fourth lens element 1040 has at least one inflection point.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. Each of the object-side surface 1051 and the image-side surface 1052 of the fifth lens element 1050 has at least one inflection point.

The IR-cut filter 1060 is made of glass material and located between the fifth lens element 1050 and the image surface 1070, and will not affect the focal length of the imaging lens system. The image sensor 1080 is disposed on or near the image surface 1070 of the imaging lens system.

The detailed optical data of the 10th embodiment are shown in Table 19 and the aspheric surface data are shown in Table 20 below.

TABLE 19

10th embodiment
f = 5.03 mm, Fno = 2.48, HFOV = 32.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.466 | | | | |
| 2 | Lens 1 | 1.403 | (ASP) | 0.617 | Plastic | 1.545 | 56.1 | 2.99 |
| 3 | | 8.576 | (ASP) | 0.157 | | | | |
| 4 | Lens 2 | −9.673 | (ASP) | 0.241 | Plastic | 1.681 | 18.7 | −6.75 |
| 5 | | 8.841 | (ASP) | 0.179 | | | | |
| 6 | Stop | Plano | | 0.168 | | | | |
| 7 | Lens 3 | −7.272 | (ASP) | 0.518 | Plastic | 1.681 | 18.7 | −447.38 |
| 8 | | −7.665 | (ASP) | 0.732 | | | | |
| 9 | Lens 4 | 41.310 | (ASP) | 0.300 | Plastic | 1.580 | 36.0 | 14.65 |
| 10 | | −10.666 | (ASP) | 1.066 | | | | |
| 11 | Lens 5 | −1.944 | (ASP) | 0.300 | Plastic | 1.544 | 56.0 | −3.91 |
| 12 | | −23.710 | (ASP) | 0.300 | | | | |
| 13 | IR-cut Filter | Plano | | 0.175 | Glass | 1.517 | 64.2 | — |
| 14 | | Plano | | 0.228 | | | | |
| 15 | Image | Plano | | — | | | | |

Note:
Reference wavelength is 587.6 nm (d-line).
An effective radius of the stop 1001 (Surface 6) is 0.850 mm.
An effective radius of the image-side surface 1042 (Surface 10) is 1.600 mm.

TABLE 20

Aspheric Coefficients

| Surface # | 2 | 3 | 4 | 5 | 7 |
|---|---|---|---|---|---|
| k= | 6.7308E−01 | 4.5259E+00 | 8.7410E+01 | −5.5889E+01 | 0.0000E+00 |
| A4= | −5.0450E−02 | 1.8966E−03 | 6.3785E−02 | 2.3060E−02 | −1.3330E−01 |
| A6= | 3.4757E−01 | 6.4837E−02 | −2.3738E−02 | 5.4104E−01 | −1.7177E−01 |

TABLE 20-continued

| Aspheric Coefficients | | | | |
|---|---|---|---|---|
| A8= | −2.5578E+00 | 1.4171E−01 | 9.8227E−01 | −3.3666E+00 | 1.1939E+00 |
| A10= | 1.0390E+01 | −2.0035E+00 | −4.9333E+00 | 1.5700E+01 | −3.6239E+00 |
| A12= | −2.5793E+01 | 8.7597E+00 | 1.4545E+01 | −4.5253E+01 | 5.8536E+00 |
| A14= | 3.9517E+01 | −1.9530E+01 | −2.6128E+01 | 8.1585E+01 | −2.4967E+00 |
| A16= | −3.6550E+01 | 2.4154E+01 | 2.8133E+01 | −8.8670E+01 | −5.9451E+00 |
| A18= | 1.8721E+01 | −1.5621E+01 | −1.6586E+01 | 5.3336E+01 | 9.1862E+00 |
| A20= | −4.0893E+00 | 4.0545E+00 | 3.9871E+00 | −1.3839E+01 | −4.0114E+00 |

| Surface # | 8 | 9 | 10 | 11 | 12 |
|---|---|---|---|---|---|
| k= | −9.9000E+01 | 1.7298E+01 | 1.6315E+00 | −1.2905E+00 | 0.0000E+00 |
| A4= | −1.5625E−01 | −9.2485E−02 | 8.2599E−03 | 9.6972E−03 | −4.8287E−02 |
| A6= | 1.0797E−01 | 1.5448E−02 | −1.2000E−01 | 3.5604E−02 | 4.9841E−02 |
| A8= | −1.8542E−01 | −3.7471E−01 | 8.8136E−02 | −6.4835E−02 | −4.7084E−02 |
| A10= | 2.9449E−01 | 8.0689E−01 | −7.2622E−02 | 4.9006E−02 | 2.6281E−02 |
| A12= | −7.4939E−02 | −9.9700E−01 | 6.8856E−02 | −1.9610E−02 | −9.0017E−03 |
| A14= | −4.0076E−01 | 7.7918E−01 | −3.8509E−02 | 4.5169E−03 | 1.9342E−03 |
| A16= | 6.1679E−01 | −3.6394E−01 | 1.1427E−02 | −6.0257E−04 | −2.5511E−04 |
| A18= | −3.6263E−01 | 9.1548E−02 | −1.6973E−03 | 4.3324E−05 | 1.8828E−05 |
| A20= | 7.6957E−02 | −9.4823E−03 | 9.8880E−05 | −1.2996E−06 | −5.9195E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 5.03 | T45/T34 | 1.46 |
| Fno | 2.48 | ΣCT/T45 | 1.85 |
| HFOV [deg.] | 32.7 | ΣAT/T45 | 2.16 |
| FOV [deg.] | 65.4 | BL/T45 | 0.66 |
| V2 + V3 + V4 | 73.40 | TL/ImgH | 1.53 |
| V3 | 18.70 | TL/[f × tan(FOV)] | 0.45 |
| CT1/CT2 | 2.56 | (R9 + R10)/(R9 − R10) | −1.18 |
| CT1/CT3 | 1.19 | \|f5/f3\| + \|f5/f4\| | 0.28 |
| CT1/CT4 | 2.06 | \|f1\|/\|f2\| | 0.44 |
| CT1/CT5 | 2.06 | \|f1\|/\|f5\| | 0.76 |
| T45/T12 | 6.79 | (f × ImgH)/[TL × (f − TL)] | 66.14 |
| T45/T23 | 3.07 | — | — |

11th Embodiment

Figure 21:
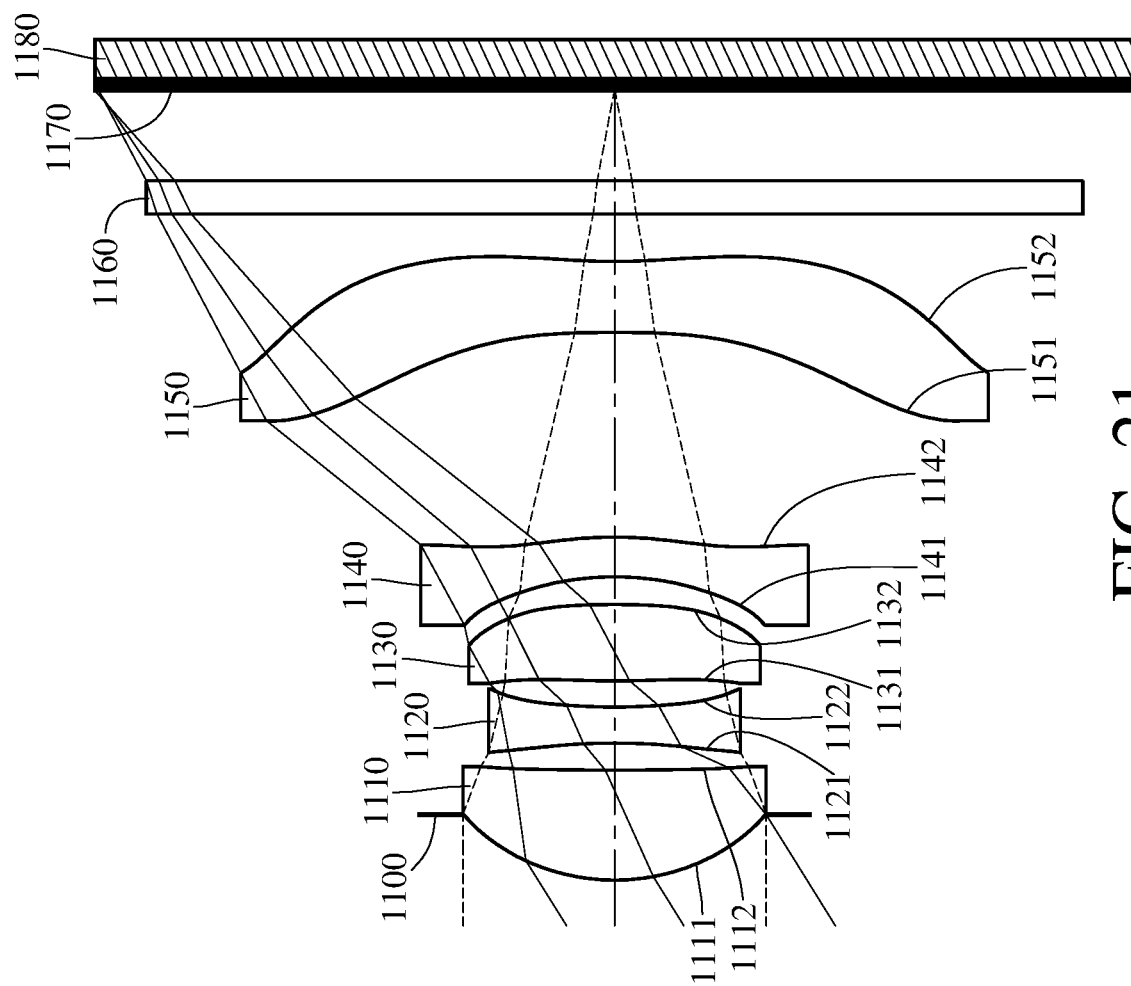
FIG. 21 is a schematic view of an image capturing unit according to the 11th embodiment of the present disclosure.
Figure 22:
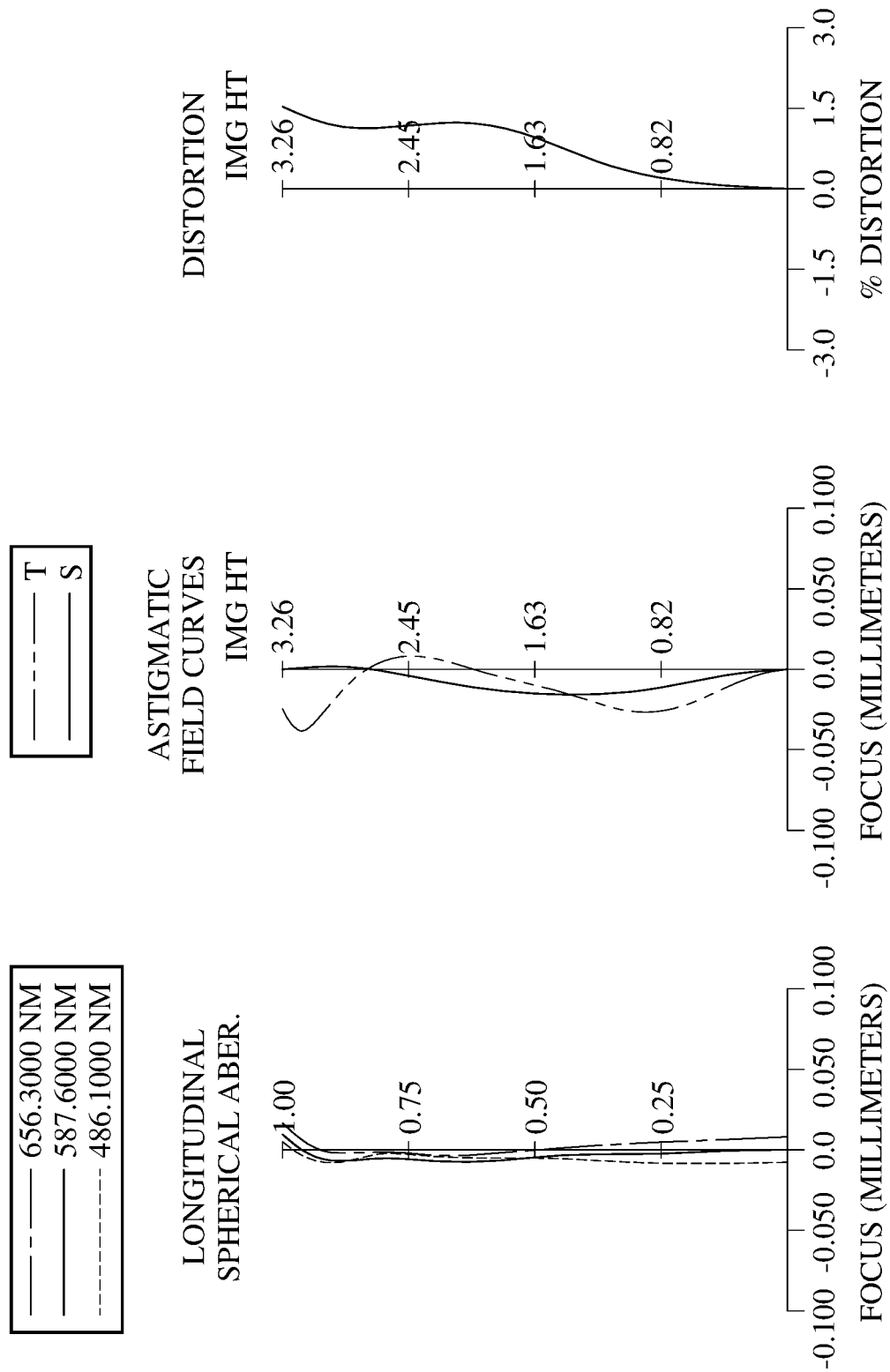
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging lens system (its reference numeral is omitted) of the present disclosure and an image sensor 1180. The imaging lens system includes, in order from an object side to an image side, an aperture stop 1100, a first lens element 1110, a second lens element 1120, a third lens element 1130, a fourth lens element 1140, a fifth lens element 1150, an IR-cut filter 1160 and an image surface 1170. The imaging lens system includes five lens elements (1110, 1120, 1130, 1140 and 1150) with no additional lens element disposed between each of the adjacent five lens elements.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with negative refractive power has an object-side surface 1121 being concave in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being convex in a paraxial region thereof. The third lens element 1130 is made of plastic material and has the object-side surface 1131 and the image-side surface 1132 being both aspheric. The object-side surface 1131 of the third lens element 1130 has at least one inflection point.

The fourth lens element 1140 with negative refractive power has an object-side surface 1141 being concave in a paraxial region thereof and an image-side surface 1142 being convex in a paraxial region thereof. The fourth lens element 1140 is made of plastic material and has the object-side surface 1141 and the image-side surface 1142 being both aspheric. The image-side surface 1142 of the fourth lens element 1140 has at least one inflection point.

The fifth lens element 1150 with negative refractive power has an object-side surface 1151 being concave in a paraxial region thereof and an image-side surface 1152 being concave in a paraxial region thereof. The fifth lens element 1150 is made of plastic material and has the object-side surface 1151 and the image-side surface 1152 being both aspheric. Each of the object-side surface 1151 and the image-side surface 1152 of the fifth lens element 1150 has at least one inflection point.

The IR-cut filter 1160 is made of glass material and located between the fifth lens element 1150 and the image surface 1170, and will not affect the focal length of the imaging lens system. The image sensor 1180 is disposed on or near the image surface 1170 of the imaging lens system.

The detailed optical data of the 11th embodiment are shown in Table 21 and the aspheric surface data are shown in Table 22 below.

TABLE 21

11th embodiment
f = 5.14 mm, Fno = 2.69, HFOV = 32.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.413 | | | | |
| 2 | Lens 1 | 1.348 | (ASP) | 0.695 | Plastic | 1.545 | 56.0 | 2.64 |
| 3 | | 17.281 | (ASP) | 0.171 | | | | |
| 4 | Lens 2 | −4.503 | (ASP) | 0.228 | Plastic | 1.660 | 20.4 | −2.93 |
| 5 | | 3.457 | (ASP) | 0.165 | | | | |
| 6 | Lens 3 | 5.100 | (ASP) | 0.483 | Plastic | 1.660 | 20.4 | 4.33 |
| 7 | | −6.259 | (ASP) | 0.175 | | | | |
| 8 | Lens 4 | −1.887 | (ASP) | 0.251 | Plastic | 1.614 | 26.0 | −13.92 |
| 9 | | −2.544 | (ASP) | 1.294 | | | | |
| 10 | Lens 5 | −10.410 | (ASP) | 0.449 | Plastic | 1.544 | 56.0 | −5.20 |
| 11 | | 3.948 | (ASP) | 0.300 | | | | |
| 12 | IR-cut Filter | Plano | | 0.210 | Glass | 1.517 | 64.2 | — |
| 13 | | Plano | | 0.567 | | | | |
| 14 | Image | Plano | | — | | | | |

Note:
Reference wavelength is 587.6 nm (d-line).
An effective radius of the image-side surface 1122 (Surface 5) is 0.785 mm.
An effective radius of the image-side surface 1152 (Surface 11) is 2.360 mm.

TABLE 22

Aspheric Coefficients

| Surface # | 2 | 3 | 4 | 5 | 6 |
|---|---|---|---|---|---|
| k= | −1.4505E−01 | 9.0000E+01 | 2.1517E+01 | 1.4143E+01 | −9.9000E+01 |
| A4= | 1.0531E−02 | −7.4476E−02 | −1.9175E−01 | −3.6149E−01 | −2.3407E−01 |
| A6= | 3.4699E−03 | 2.5938E−01 | 1.4110E+00 | 1.5923E+00 | 1.7220E−01 |
| A8= | 4.3779E−02 | −4.6718E−01 | −3.6509E+00 | −3.5843E+00 | 2.7106E−01 |
| A10= | −6.2851E−02 | 5.8377E−01 | 5.9173E+00 | 5.0637E+00 | −1.9611E+00 |
| A12= | 4.9011E−02 | −3.2582E−01 | −5.4110E+00 | −3.6620E+00 | 3.9617E+00 |
| A14= | — | — | 2.0293E+00 | 7.6755E−01 | −2.6767E+00 |

| Surface # | 7 | 8 | 9 | 10 | 11 |
|---|---|---|---|---|---|
| k= | 2.0334E+01 | −2.7387E+00 | −1.9514E+01 | 1.5624E+01 | −4.0413E+01 |
| A4= | −2.7870E−01 | −1.1548E−01 | −3.7689E−02 | −1.5733E−01 | −1.0658E−01 |
| A6= | 1.8957E−01 | 2.0850E−01 | 4.2309E−01 | 1.2311E−01 | 5.9639E−02 |
| A8= | −6.3963E−01 | −2.0182E−03 | −5.7336E−01 | −6.4763E−02 | −2.6152E−02 |
| A10= | 1.1021E+00 | −1.6619E−01 | 4.0938E−01 | 2.2045E−02 | 7.2317E−03 |
| A12= | −6.3494E−01 | 4.2293E+00 | −2.0227E−01 | −4.3643E−03 | −1.2443E−03 |
| A14= | −4.1942E−02 | −4.3391E+00 | 6.8041E−02 | 4.5806E−04 | 1.1948E−04 |
| A16= | — | 1.5403E+00 | −1.0842E−02 | −1.9696E−05 | −4.6518E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

11th Embodiment

| f [mm] | 5.14 | T45/T34 | 7.39 |
|---|---|---|---|
| Fno | 2.69 | ΣCT/T45 | 1.63 |
| HFOV [deg.] | 32.0 | ΣAT/T45 | 1.39 |
| FOV [deg.] | 64.0 | BL/T45 | 0.83 |
| V2 + V3 + V4 | 66.77 | TL/ImgH | 1.53 |
| V3 | 20.40 | TL/[f × tan(FOV)] | 0.47 |

11th Embodiment

| CT1/CT2 | 3.05 | (R9 + R10)/(R9 − R10) | 0.45 |
|---|---|---|---|
| CT1/CT3 | 1.44 | |f5/f3| + |f5/f4| | 1.58 |
| CT1/CT4 | 2.77 | |f1|/|f2| | 0.90 |
| CT1/CT5 | 1.55 | |f1|/|f5| | 0.51 |
| T45/T12 | 7.57 | (f × ImgH)/[TL × (f − TL)] | 21.53 |
| T45/T23 | 7.84 | — | |

12th Embodiment

Figure 23:
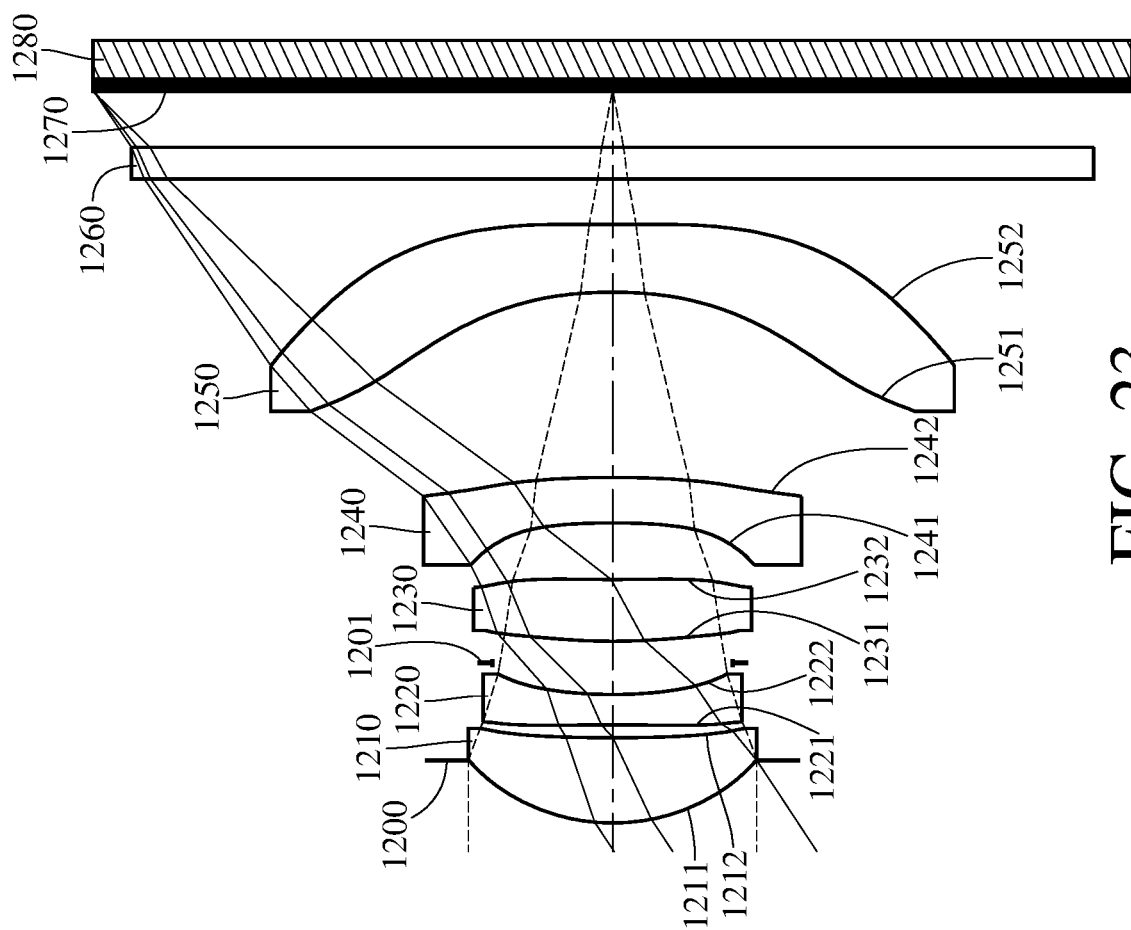
FIG. 23 is a schematic view of an image capturing unit according to the 12th embodiment of the present disclosure.
Figure 24:
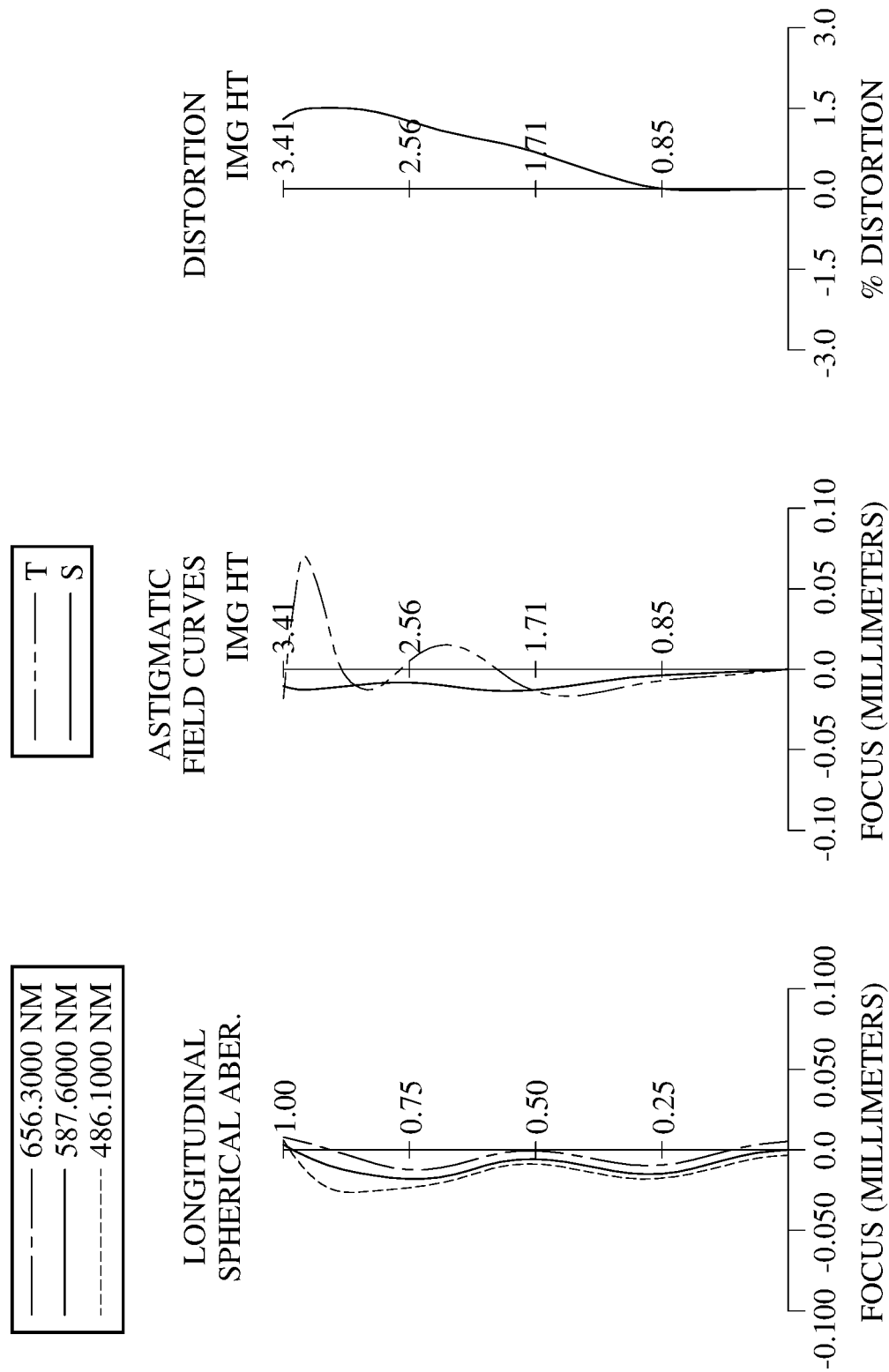
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the imaging lens system (its reference numeral is omitted) of the present disclosure and an image sensor 1280. The imaging lens system includes, in order from an object side to an image side, an aperture stop 1200, a first lens element 1210, a second lens element 1220, a stop 1201, a third lens element 1230, a fourth lens element 1240, a fifth lens element 1250, an IR-cut filter 1260 and an image surface 1270. The imaging lens system includes five lens elements (1210, 1220, 1230, 1240 and 1250) with no additional lens element disposed between each of the adjacent five lens elements.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric.

The second lens element 1220 with negative refractive power has an object-side surface 1221 being concave in a paraxial region thereof and an image-side surface 1222 being concave in a paraxial region thereof. The second lens element 1220 is made of plastic material and has the object-side surface 1221 and the image-side surface 1222 being both aspheric.

The third lens element 1230 with positive refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric. The image-side surface 1232 of the third lens element 1230 has at least one inflection point.

The fourth lens element 1240 with negative refractive power has an object-side surface 1241 being concave in a paraxial region thereof and an image-side surface 1242 being convex in a paraxial region thereof. The fourth lens element 1240 is made of plastic material and has the object-side surface 1241 and the image-side surface 1242 being both aspheric. The image-side surface 1242 of the fourth lens element 1240 has at least one inflection point.

The fifth lens element 1250 with negative refractive power has an object-side surface 1251 being concave in a paraxial region thereof and an image-side surface 1252 being concave in a paraxial region thereof. The fifth lens element 1250 is made of plastic material and has the object-side surface 1251 and the image-side surface 1252 being both aspheric. Each of the object-side surface 1251 and the image-side surface 1252 of the fifth lens element 1250 has at least one inflection point.

The IR-cut filter 1260 is made of glass material and located between the fifth lens element 1250 and the image surface 1270, and will not affect the focal length of the imaging lens system. The image sensor 1280 is disposed on or near the image surface 1270 of the imaging lens system.

The detailed optical data of the 12th embodiment are shown in Table 23 and the aspheric surface data are shown in Table 24 below.

TABLE 23

12th embodiment
f = 5.11 mm, Fno = 2.69, HFOV = 33.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.412 | | | | |
| 2 | Lens 1 | 1.321 | (ASP) | 0.562 | Plastic | 1.545 | 56.1 | 2.68 |
| 3 | | 11.899 | (ASP) | 0.085 | | | | |
| 4 | Lens 2 | −14.128 | (ASP) | 0.200 | Plastic | 1.660 | 20.4 | −3.87 |
| 5 | | 3.135 | (ASP) | 0.209 | | | | |
| 6 | Stop | Plano | | 0.142 | | | | |
| 7 | Lens 3 | 3.888 | (ASP) | 0.407 | Plastic | 1.660 | 20.4 | 8.20 |
| 8 | | 13.231 | (ASP) | 0.373 | | | | |
| 9 | Lens 4 | −5.362 | (ASP) | 0.300 | Plastic | 1.614 | 26.0 | −32.46 |
| 10 | | −7.494 | (ASP) | 1.221 | | | | |
| 11 | Lens 5 | −2.872 | (ASP) | 0.446 | Plastic | 1.544 | 56.0 | −4.71 |
| 12 | | 24.936 | (ASP) | 0.300 | | | | |
| 13 | IR-cut Filter | Plano | | 0.210 | Glass | 1.517 | 64.2 | — |
| 14 | | Plano | | 0.365 | | | | |
| 15 | Image | Plano | | — | | | | |

Note:
Reference wavelength is 587.6 nm (d-line).
An effective radius of the stop 1201 (Surface 6) is 0.790 mm.
An effective radius of the image-side surface 1232 (Surface 8) is 0.915 mm.
An effective radius of the image-side surface 1252 (Surface 12) is 2.250 mm.

TABLE 24

Aspheric Coefficients

| Surface # | 2 | 3 | 4 | 5 | 7 |
|---|---|---|---|---|---|
| k= | −2.1687E−01 | 6.8382E+01 | 9.0000E+01 | −3.2484E+00 | −8.3955E+00 |
| A4= | 7.4088E−03 | 4.7559E−03 | 7.8797E−02 | 7.9183E−02 | −6.0537E−02 |
| A6= | 4.2689E−02 | 2.8093E−01 | 2.4937E−01 | 3.1472E−01 | −9.4476E−02 |
| A8= | −4.5218E−02 | −1.0123E+00 | −1.1712E+00 | −1.4489E+00 | 4.9438E−01 |
| A10= | 1.7279E−02 | 1.6317E+00 | 2.3820E+00 | 3.9411E+00 | −1.0517E+00 |

TABLE 24-continued

| Aspheric Coefficients | | | | | |
|---|---|---|---|---|---|
| A12= | 2.6921E−02 | −9.1118E−01 | −2.0148E+00 | −4.7575E+00 | 1.2850E+00 |
| A14= | — | — | 4.8872E−01 | 2.1749E+00 | −5.3574E−01 |

| Surface # | 8 | 9 | 10 | 11 | 12 |
|---|---|---|---|---|---|
| k= | 5.1294E+01 | 2.1818E+01 | 1.7116E+01 | −2.5623E+01 | −9.9000E+01 |
| A4= | −1.5193E−01 | −1.7798E−01 | −5.3732E−02 | −2.5014E−01 | −1.4117E−01 |
| A6= | 9.0377E−02 | 1.7024E−01 | 1.7076E−01 | 2.4915E−01 | 9.7232E−02 |
| A8= | −6.7059E−01 | −7.9085E−01 | −5.5806E−01 | −1.8080E−01 | −5.1349E−02 |
| A10= | 1.6594E+00 | 6.5856E−01 | 8.7736E−01 | 8.2231E−02 | 1.6825E−02 |
| A12= | −1.8805E+00 | 5.8297E−01 | −6.5906E−01 | −2.1203E−02 | −3.3623E−03 |
| A14= | 9.1213E−01 | −1.1405E+00 | 2.3869E−01 | 2.8581E−03 | 3.7994E−04 |
| A16= | — | 4.6947E−01 | −3.3930E−02 | −1.5762E−04 | −1.8571E−05 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 5.11 | T45/T34 | 3.27 |
| Fno | 2.69 | ΣCT/T45 | 1.57 |
| HFOV [deg.] | 33.5 | ΣAT/T45 | 1.66 |
| FOV [deg.] | 67.0 | BL/T45 | 0.72 |
| V2 + V3 + V4 | 66.77 | TL/ImgH | 1.41 |
| V3 | 20.40 | TL/[f × tan(FOV)] | 0.40 |
| CT1/CT2 | 2.81 | (R9 + R10)/(R9 − R10) | −0.79 |
| CT1/CT3 | 1.38 | |f5/f3| + |f5/f4| | 0.72 |
| CT1/CT4 | 1.87 | |f1|/|f2| | 0.69 |
| CT1/CT5 | 1.26 | |f1|/|f5| | 0.57 |
| T45/T12 | 14.36 | (f × ImgH)/[TL × (f − TL)] | 12.64 |
| T45/T23 | 3.48 | — | — |

13th Embodiment

Figure 25:
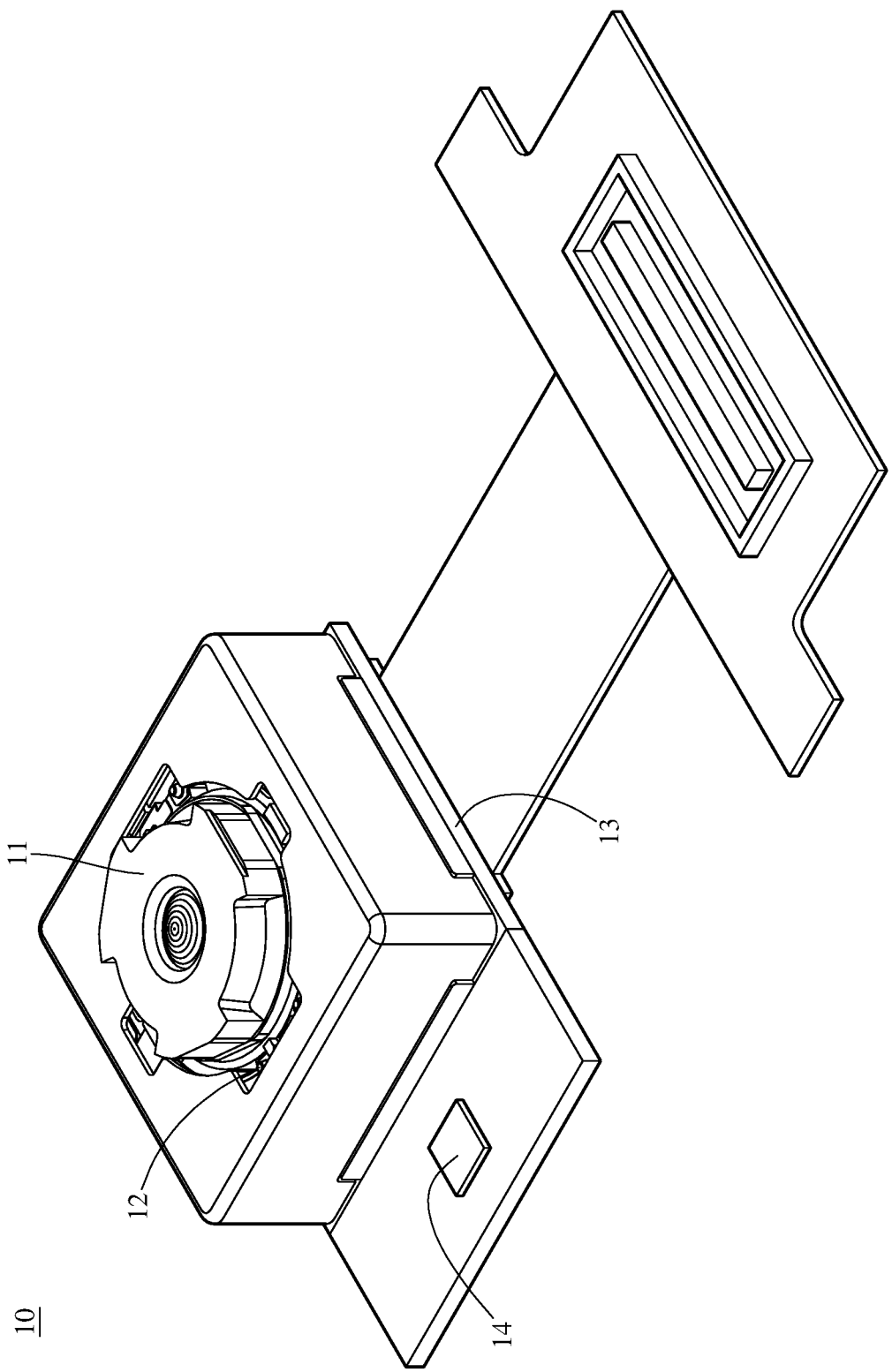
FIG. 25 is a perspective view of an image capturing unit according to the 13th embodiment of the present disclosure.

FIG. 25 is a perspective view of an image capturing unit according to the 13th embodiment of the present disclosure. In this embodiment, an image capturing unit 10 is a camera module including a lens unit 11, a driving device 12, an image sensor 13 and an image stabilizer 14. The lens unit 11 includes the imaging lens system disclosed in the 1st embodiment, a barrel and a holder member (their reference numerals are omitted) for holding the imaging lens system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

14th Embodiment

Figure 26:
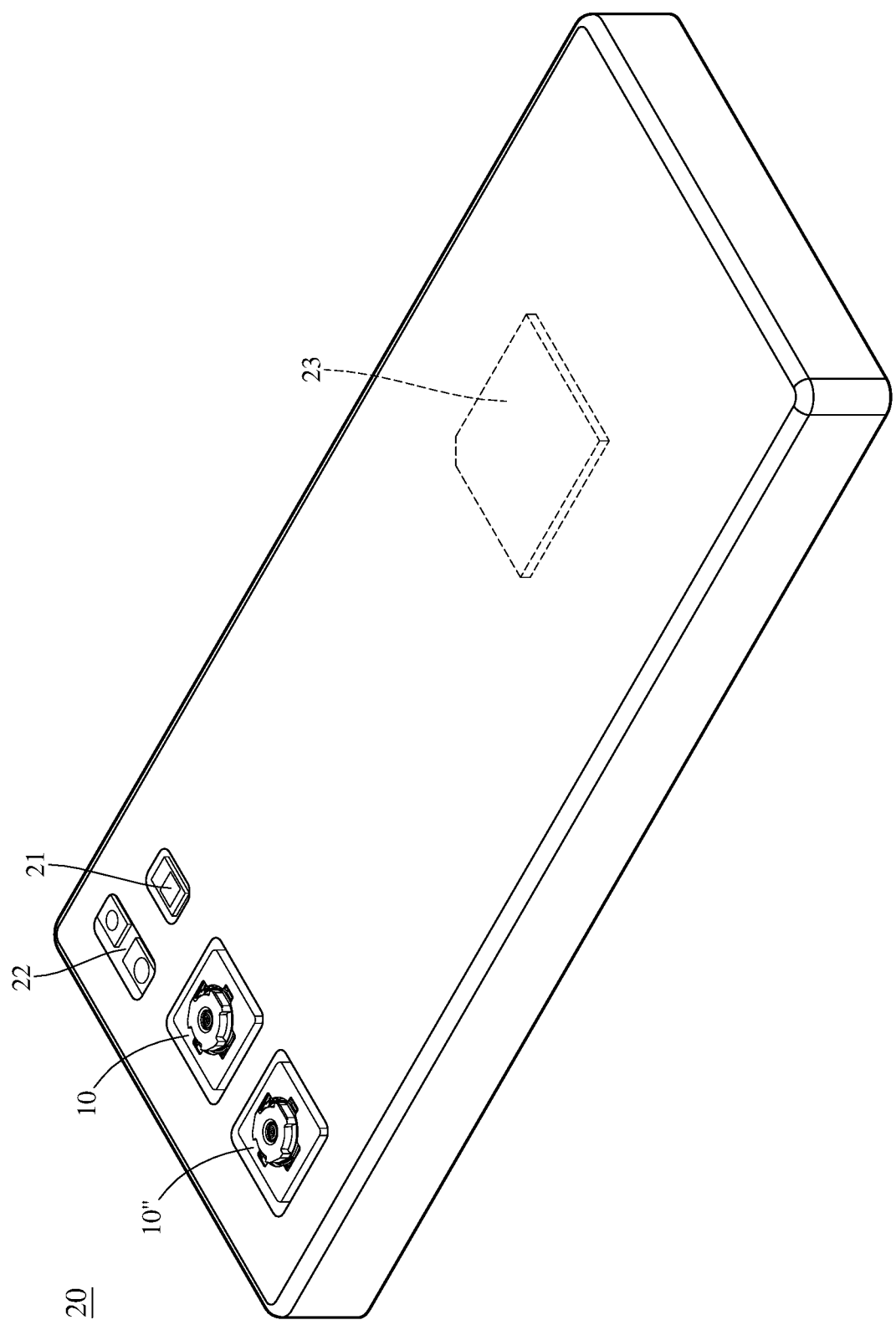
FIG. 26 is one perspective view of an electronic device according to the 14th embodiment of the present disclosure.
Figure 27:
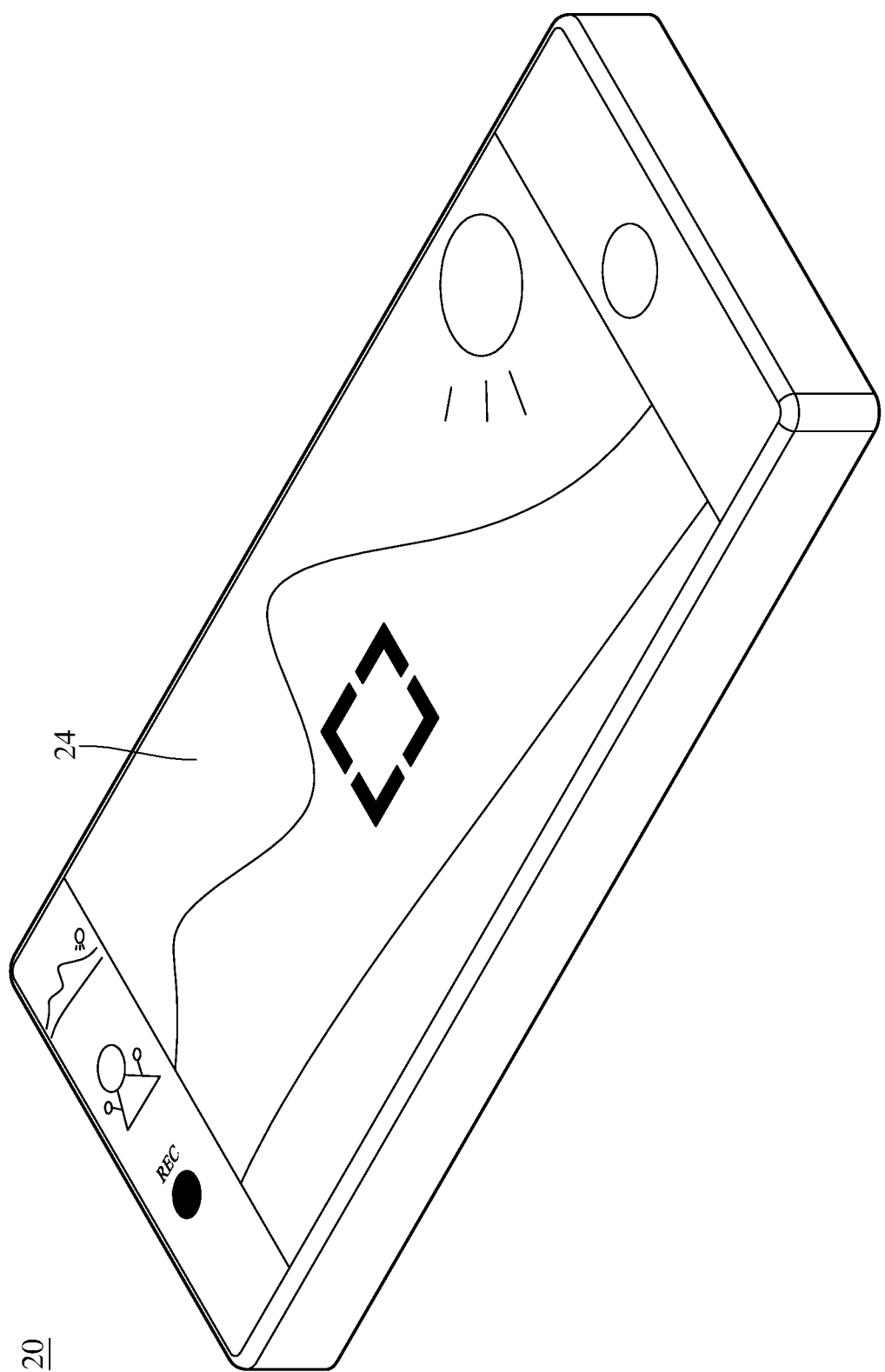
FIG. 27 is another perspective view of the electronic device in FIG. 26.
Figure 28:
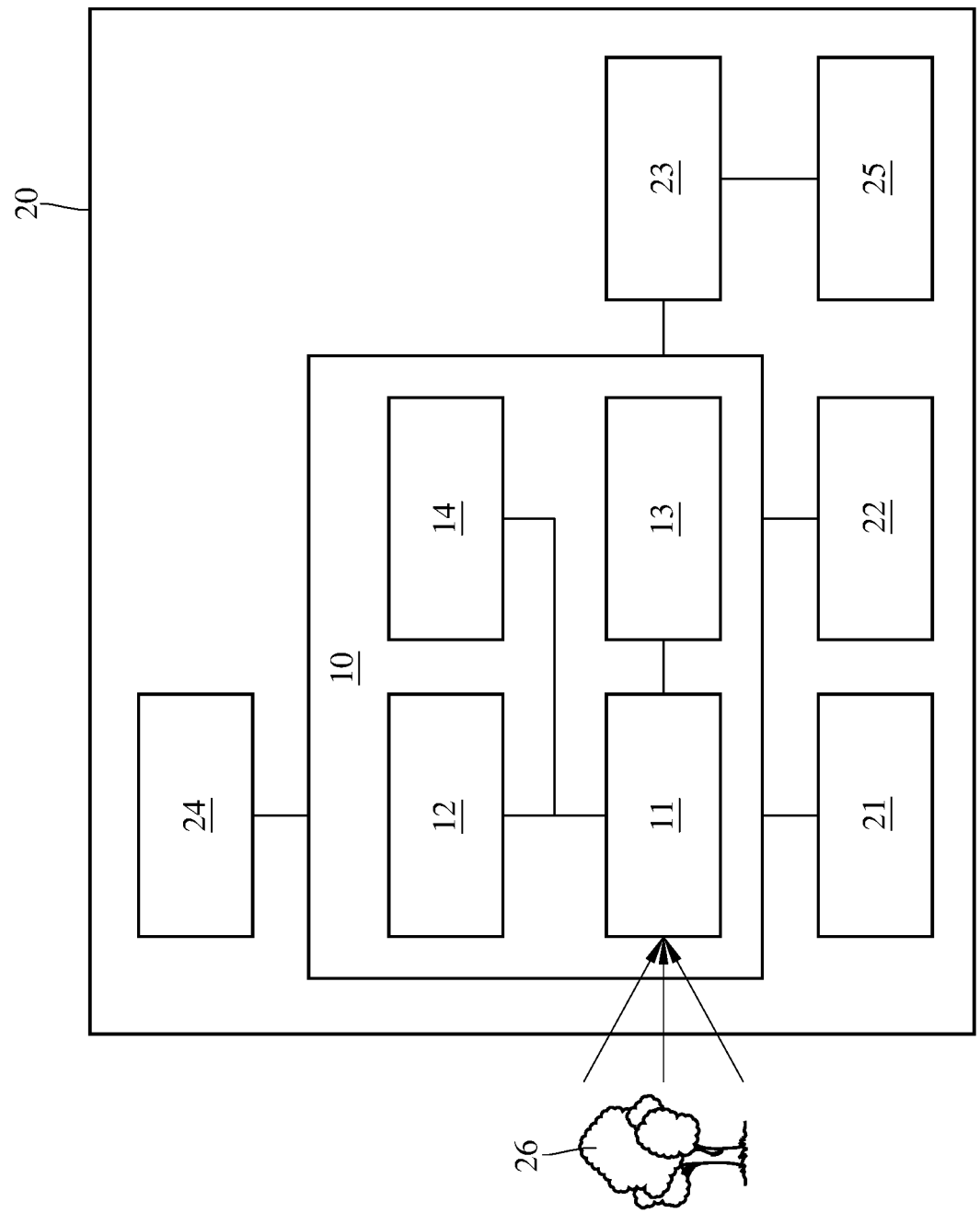
FIG. 28 is a block diagram of the electronic device in FIG. 26.

FIG. 26 is one perspective view of an electronic device according to the 14th embodiment of the present disclosure. FIG. 27 is another perspective view of the electronic device in FIG. 26. FIG. 28 is a block diagram of the electronic device in FIG. 26. In this embodiment, an electronic device 20 is a smartphone including the image capturing unit 10 disclosed in the 13th embodiment, an image capturing unit 10″, a flash module 21, a focus assist module 22, an image signal processor 23, a user interface 24 and an image software processor 25. In this embodiment, the electronic device 20 includes two image capturing units 10, 10″ having different fields of view, but the disclosure is not limited thereto. For example, the two image capturing units 10, 10″ can also have the same field of view. Furthermore, in this embodiment, the electronic device 20 includes two image capturing units 10, 10″, but the disclosure is not limited thereto. In some cases, the electronic device 20 can include only one image capturing unit 10, or the electronic device 20 can include more than two image capturing units.

When a user captures images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising five lens elements, the five lens elements being, in order from an object side to an image side: a first lens element, a second lens element, a third lens element, a fourth lens element and a fifth lens element;
   wherein the first lens element with positive refractive power has an object-side surface being convex in a paraxial region thereof, the second lens element has an image-side surface being concave in a paraxial region thereof, the third lens element has an object-side surface being convex in a paraxial region thereof, the fourth lens element has negative refractive power, the fifth lens element has an image-side surface being concave in a paraxial region thereof, and an absolute value of a focal length of the first lens element is smaller than an absolute value of a focal length of the third lens element;
   wherein an Abbe number of the second lens element is V2, an Abbe number of the third lens element is V3, an Abbe number of the fourth lens element is V4, an axial distance between the first lens element and the second lens element is T12, an axial distance between the third lens element and the fourth lens element is T34, an axial distance between the fourth lens element and the fifth lens element is T45, and the following conditions are satisfied:
   V2+V3+V4<90;
   1.0<T45/T34; and
   1.0<T45/T12.

2. The imaging lens system of claim 1, wherein the Abbe number of the second lens element is V2, the Abbe number of the third lens element is V3, the Abbe number of the fourth lens element is V4, and the following condition is satisfied:
   V2+V3+V4<78.2.

3. The imaging lens system of claim 1, wherein a central thickness of the first lens element is CT1, a central thickness of the second lens element is CT2, a central thickness of the third lens element is CT3, a central thickness of the fourth lens element is CT4, a central thickness of the fifth lens element is CT5, and the following conditions are satisfied:
   1.0<CT1/CT2;
   1.0<CT1/CT3;
   1.0<CT1/CT4; and
   1.0<CT1/CT5.

4. The imaging lens system of claim 1, wherein the focal length of the first lens element is f1, a focal length of the fifth lens element is f5, and the following condition is satisfied:
   |f1|/|f5|<1.0.

5. The imaging lens system of claim 1, wherein a sum of axial distances between each of all adjacent lens elements of the imaging lens system is ΣAT, the axial distance between the fourth lens element and the fifth lens element is T45, and the following condition is satisfied:
   ΣAT/T45<3.0.

6. The imaging lens system of claim 1, wherein the third lens element has positive refractive power, the Abbe number of the third lens element is V3, and the following condition is satisfied:
   V3<32.

7. The imaging lens system of claim 1, wherein the second lens element has negative refractive power.

8. The imaging lens system of claim 1, wherein the third lens element has an image-side surface being concave in a paraxial region thereof.

9. The imaging lens system of claim 1, wherein at least one of an object-side surface and an image-side surface of the fourth lens element has at least one inflection point.

10. The imaging lens system of claim 1, wherein at least one of an object-side surface and the image-side surface of the fifth lens element has at least one inflection point, object-side surfaces and image-side surfaces of the five lens elements of the imaging lens system are aspheric, and the five lens elements of the imaging lens system are made of plastic material.

11. An image capturing unit, comprising:
    the imaging lens system of claim 1; and
    an image sensor disposed on an image surface of the imaging lens system.

12. An electronic device, comprising:
    the image capturing unit of claim 11.

13. An imaging lens system comprising five lens elements, the five lens elements being, in order from an object side to an image side: a first lens element, a second lens element, a third lens element, a fourth lens element and a fifth lens element;
    wherein the first lens element has an object-side surface being convex in a paraxial region thereof, the third lens element has an image-side surface being concave in a paraxial region thereof, and the fourth lens element has negative refractive power;
    wherein a focal length of the imaging lens system is f, a maximum image height of the imaging lens system is ImgH, an axial distance between the object-side surface of the first lens element and an image surface is TL, an axial distance between the third lens element and the fourth lens element is T34, an axial distance between the fourth lens element and the fifth lens element is T45, an Abbe number of the second lens element is V2, an Abbe number of the third lens element is V3, an Abbe number of the fourth lens element is V4, and the following conditions are satisfied:
    7.0<(f×ImgH)/[TL×(f-TL)];
    1.0<T45/T34; and
    V2+V3+V4<90.

14. The imaging lens system of claim 13, wherein at least one of an object-side surface and the image-side surface of the third lens element has at least one inflection point.

15. The imaging lens system of claim 13, wherein a focal length of the first lens element is f1, a focal length of the fifth lens element is f5, and the following condition is satisfied:

|f1|/|f5|<1.0.

16. The imaging lens system of claim 13, wherein the focal length of the imaging lens system is f, the maximum image height of the imaging lens system is ImgH, the axial distance between the object-side surface of the first lens element and the image surface is TL, and the following condition is satisfied:

10<(f×ImgH)/[TL×(f-TL)]<50.

17. The imaging lens system of claim 13, wherein a central thickness of the first lens element is CT1, a central thickness of the second lens element is CT2, a central thickness of the third lens element is CT3, a central thickness of the fourth lens element is CT4, a central thickness of the fifth lens element is CT5, and the following conditions are satisfied:

1.0<CT1/CT2;
1.0<CT1/CT3;
1.0<CT1/CT4; and
1.0<CT1/CT5.

18. The imaging lens system of claim 13, wherein a sum of axial distances between each of all adjacent lens elements of the imaging lens system is ΣAT, the axial distance between the fourth lens element and the fifth lens element is T45, and the following condition is satisfied:

ΣAT/T45<3.0.

19. The imaging lens system of claim 13, wherein the first lens element has positive refractive power, and the second lens element has negative refractive power.

20. The imaging lens system of claim 13, wherein the third lens element has positive refractive power, object-side surfaces and image-side surfaces of the five lens elements of the imaging lens system are aspheric, the five lens elements of the imaging lens system are made of plastic material, the Abbe number of the third lens element is V3, and the following condition is satisfied:

V3<32.

21. The imaging lens system of claim 13, wherein a curvature radius of an object-side surface of the fifth lens element is R9, a curvature radius of an image-side surface of the fifth lens element is R10, and the following condition is satisfied: −2.0<(R9+R10)/(R9-R10)<0.

22. The imaging lens system of claim 13, wherein an axial distance between an image-side surface of the fifth lens element and the image surface is BL, the axial distance between the fourth lens element and the fifth lens element is T45, and the following condition is satisfied:

0<BL/T45<3.0.

23. The imaging lens system of claim 13, wherein the axial distance between the object-side surface of the first lens element and the image surface is TL, the focal length of the imaging lens system is f, a maximum field of view of the imaging lens system is FOV, and the following condition is satisfied:

0.35<TL/[f·tan(FOV)]<0.55.

24. An image capturing unit, comprising:
the imaging lens system of claim 13; and
an image sensor disposed on the image surface of the imaging lens system.

25. An electronic device, comprising:
the image capturing unit of claim 24.

* * * * *